United States Patent
Kobel et al.

(10) Patent No.: US 12,461,508 B2
(45) Date of Patent: Nov. 4, 2025

(54) SYSTEM AND METHOD FOR CONDITIONAL DATA REPORTING

(71) Applicant: Oshkosh Corporation, Oshkosh, WI (US)

(72) Inventors: Korry D. Kobel, Oshkosh, WI (US);
Fredric L. Yutzy, Oshkosh, WI (US);
Dan Adamson, Oshkosh, WI (US);
Patrick Booth, Oshkosh, WI (US);
Joseph Gruber, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

(21) Appl. No.: 18/841,906

(22) PCT Filed: Mar. 8, 2024

(86) PCT No.: PCT/US2024/019216
§ 371 (c)(1),
(2) Date: Aug. 27, 2024

(87) PCT Pub. No.: WO2024/191862
PCT Pub. Date: Sep. 19, 2024

(65) Prior Publication Data
US 2025/0116994 A1    Apr. 10, 2025

Related U.S. Application Data

(60) Provisional application No. 63/451,506, filed on Mar. 10, 2023, provisional application No. 63/489,562, (Continued)

(51) Int. Cl.
*G05B 19/418* (2006.01)

(52) U.S. Cl.
CPC ..... *G05B 19/4183* (2013.01); *G05B 19/4185* (2013.01)

(58) Field of Classification Search
CPC ... E02F 3/435; E02F 9/262; E02F 3/32; E02F 3/437; E02F 9/20; E02F 9/265;
(Continued)

(56) References Cited

U.S. PATENT DOCUMENTS

| | | |
|---|---|---|
| 2003/0230412 A1 | 12/2003 | Archer |
| 2003/0230863 A1 | 12/2003 | Archer |

(Continued)

FOREIGN PATENT DOCUMENTS

| | | |
|---|---|---|
| EP | 2 597 826 B1 | 5/2013 |
| EP | 3 200 482 A1 | 8/2017 |

(Continued)

OTHER PUBLICATIONS

International Search and Written Opinion issued in connection with PCT/US2024/0192226 dated Jul. 16, 2024, 14 pps.

(Continued)

*Primary Examiner* — Mohammad K Islam
(74) *Attorney, Agent, or Firm* — FOLEY & LARDNER LLP

(57) ABSTRACT

A system may include a connectivity module communicatively and physically coupled to a work machine and a processing circuit configured to generate a profile corresponding to the connectivity module and the work machine. The processing circuit may include memory devices configured to store instructions that cause the one or more processors to: generate the profile corresponding to the work machine and the connectivity module, the profile initially comprising a base state; receive data indicative of one or more functionalities of the work machine; populate, after receiving the data indicative of the one or more functionalities of the work machine, the profile with entries that define a machine-specific state of the profile that facilitates data interpretation and collection related to the one or more (Continued)

functionalities of the work machine; and send the profile comprising the machine-specific state to the connectivity module.

15 Claims, 15 Drawing Sheets

Related U.S. Application Data filed on Mar. 10, 2023, provisional application No. 63/489,558, filed on Mar. 10, 2023, provisional application No. 63/451,390, filed on Mar. 10, 2023, provisional application No. 63/451,504, filed on Mar. 10, 2023, provisional application No. 63/489,538, filed on Mar. 10, 2023, provisional application No. 63/489,533, filed on Mar. 10, 2023, provisional application No. 63/451,351, filed on Mar. 10, 2023, provisional application No. 63/451,387, filed on Mar. 10, 2023, provisional application No. 63/489,531, filed on Mar. 10, 2023, provisional application No. 63/489,560, filed on Mar. 10, 2023, provisional application No. 63/451,342, filed on Mar. 10, 2023.

(58) Field of Classification Search
CPC ......... E02F 3/847; E02F 9/123; E02F 9/2004; E02F 9/2033; E02F 9/205; E02F 9/2075; E02F 9/2091; E02F 9/2095; E02F 9/22; E02F 9/2203; E02F 9/2225; E02F 9/2285; E02F 9/2292; E02F 9/2296; E02F 9/26; E02F 9/261; E02F 9/264; E02F 9/267; G07C 5/02; G07C 5/085; B66C 13/18; B66C 23/84; G05B 19/4183
See application file for complete search history.

(56) References Cited

U.S. PATENT DOCUMENTS

| | | |
|---|---|---|
| 2004/0002794 A1 | 1/2004 | Pillar et al. |
| 2004/0039510 A1 | 2/2004 | Archer et al. |
| 2004/0173404 A1 | 9/2004 | Kobel |
| 2004/0199302 A1 | 10/2004 | Pillar et al. |
| 2005/0001400 A1 | 1/2005 | Archer et al. |
| 2005/0234622 A1 | 10/2005 | Pillar et al. |
| 2006/0021764 A1 | 2/2006 | Archer et al. |
| 2006/0022001 A1 | 2/2006 | Linsmeier et al. |
| 2006/0032701 A1 | 2/2006 | Linsmeier et al. |
| 2006/0032702 A1 | 2/2006 | Linsmeier et al. |
| 2006/0037816 A1 | 2/2006 | Kobel |
| 2006/0065411 A1 | 3/2006 | Linsmeier et al. |
| 2006/0086566 A1 | 4/2006 | Linsmeier et al. |
| 2006/0180322 A1 | 8/2006 | Archer et al. |
| 2007/0189882 A1 | 8/2007 | Smith et al. |
| 2008/0114513 A1 | 5/2008 | Pillar et al. |
| 2008/0154712 A1 | 6/2008 | Wellman |
| 2009/0033044 A1 | 2/2009 | Linsmeier |
| 2014/0246265 A1 | 9/2014 | Archer et al. |
| 2014/0262355 A1 | 9/2014 | Linsmeier |
| 2016/0001720 A1 | 1/2016 | Vadgama et al. |
| 2016/0144211 A1 | 5/2016 | Betz et al. |
| 2016/0145941 A1 | 5/2016 | Betz et al. |
| 2016/0304051 A1 | 10/2016 | Archer et al. |
| 2016/0378076 A1 | 12/2016 | Hill et al. |
| 2017/0289121 A1 | 10/2017 | Harwell |
| 2018/0011451 A1 | 1/2018 | Hill et al. |
| 2018/0215354 A1 | 8/2018 | Linsmeier et al. |
| 2018/0215597 A1 | 8/2018 | Linsmeier et al. |
| 2018/0274668 A1 | 9/2018 | Gray et al. |
| 2018/0289999 A1 | 10/2018 | Kay et al. |
| 2018/0293818 A1 | 10/2018 | Linsmeier et al. |
| 2018/0297597 A1 | 10/2018 | Linsmeier et al. |
| 2018/0359903 A1 | 12/2018 | Lee |
| 2019/0106083 A1 | 4/2019 | Archer et al. |
| 2019/0121353 A1 | 4/2019 | Datema et al. |
| 2019/0262646 A1 | 8/2019 | Linsmeier et al. |
| 2019/0263408 A1 | 8/2019 | Linsmeier et al. |
| 2019/0359184 A1 | 11/2019 | Linsmeier et al. |
| 2019/0359460 A1 | 11/2019 | Linsmeier et al. |
| 2020/0038700 A1 | 2/2020 | Betz et al. |
| 2020/0039804 A1 | 2/2020 | Betz et al. |
| 2020/0047013 A1 | 2/2020 | Betz et al. |
| 2020/0056426 A1 | 2/2020 | Betz et al. |
| 2020/0095105 A1 | 3/2020 | Yutzy et al. |
| 2020/0108285 A1 | 4/2020 | Kay et al. |
| 2020/0130653 A1 | 4/2020 | Betz et al. |
| 2020/0231131 A1 | 7/2020 | Archer et al. |
| 2020/0238115 A1 | 7/2020 | Linsmeier et al. |
| 2020/0279444 A1 | 9/2020 | Linsmeier et al. |
| 2021/0060366 A1 | 3/2021 | Minnick et al. |
| 2021/0107361 A1 | 4/2021 | Linsmeier et al. |
| 2021/0116601 A1 | 4/2021 | Sherlock et al. |
| 2021/0178206 A1 | 6/2021 | Betz et al. |
| 2021/0209870 A1 | 7/2021 | Thomas et al. |
| 2021/0229628 A1 | 7/2021 | Archer et al. |
| 2021/0244982 A1 | 8/2021 | Betz et al. |
| 2021/0253102 A1 | 8/2021 | Linsmeier et al. |
| 2021/0276450 A1 | 9/2021 | Eshleman et al. |
| 2021/0279914 A1 | 9/2021 | Shoup et al. |
| 2021/0339065 A1 | 11/2021 | Linsmeier et al. |
| 2022/0009761 A1 | 1/2022 | Archer et al. |
| 2022/0017048 A1 | 1/2022 | Betz et al. |
| 2022/0024425 A1 | 1/2022 | Linsmeier et al. |
| 2022/0074417 A1 | 3/2022 | Linsmeier et al. |
| 2022/0080944 A1 | 3/2022 | Linsmeier et al. |
| 2022/0097527 A1 | 3/2022 | Koga et al. |
| 2022/0097961 A1 | 3/2022 | Koga et al. |
| 2022/0097964 A1 | 3/2022 | Koga et al. |
| 2022/0112060 A1 | 4/2022 | Archer et al. |
| 2022/0112061 A1 | 4/2022 | Archer et al. |
| 2022/0177055 A1 | 6/2022 | Archer |
| 2022/0185582 A1 | 6/2022 | Koga et al. |
| 2022/0193473 A1 | 6/2022 | Kay et al. |
| 2022/0194769 A1 | 6/2022 | Kobel et al. |
| 2022/0198905 A1 | 6/2022 | Brulo et al. |
| 2022/0227612 A1 | 7/2022 | Kobel et al. |
| 2022/0227613 A1 | 7/2022 | Boroni et al. |
| 2022/0227614 A1 | 7/2022 | Yutzy et al. |
| 2022/0229415 A1 | 7/2022 | Kobel et al. |
| 2022/0229431 A1 | 7/2022 | Kobel et al. |
| 2022/0229523 A1 | 7/2022 | Kobel et al. |
| 2022/0229872 A1 | 7/2022 | Kobel et al. |
| 2022/0230224 A1 | 7/2022 | Kobel et al. |
| 2022/0230488 A1 | 7/2022 | Kobel et al. |
| 2022/0230523 A1 | 7/2022 | Kobel et al. |
| 2022/0232352 A1 | 7/2022 | Kobel et al. |
| 2022/0232649 A1 | 7/2022 | Kobel et al. |
| 2022/0242713 A1 | 8/2022 | Betz et al. |
| 2022/0245856 A1* | 8/2022 | Hoso ................. H04N 7/181 |
| 2022/0307237 A1* | 9/2022 | Yoneda ............... E02F 9/267 |
| 2022/0309844 A1 | 9/2022 | Linsmeier et al. |
| 2022/0311747 A1 | 9/2022 | Khessin et al. |
| 2022/0332556 A1 | 10/2022 | Kobel et al. |
| 2022/0355140 A1 | 11/2022 | Linsmeier et al. |
| 2022/0355141 A1 | 11/2022 | Linsmeier et al. |
| 2022/0355142 A1 | 11/2022 | Linsmeier et al. |
| 2022/0355690 A1 | 11/2022 | Linsmeier et al. |
| 2022/0379892 A1 | 12/2022 | Archer et al. |
| 2022/0412048 A1* | 12/2022 | Sasaki ................ E02F 9/205 |
| 2023/0020040 A1 | 1/2023 | Tam |
| 2023/0046835 A1 | 2/2023 | Kobel et al. |
| 2023/0089417 A1 | 3/2023 | Koga et al. |
| 2023/0131482 A1 | 4/2023 | Kobel et al. |
| 2023/0141456 A1 | 5/2023 | Archer et al. |
| 2023/0142225 A1 | 5/2023 | Kobel et al. |
| 2023/0149754 A1 | 5/2023 | Linsmeier et al. |
| 2023/0159104 A1 | 5/2023 | Archer |
| 2023/0166144 A1 | 6/2023 | Linsmeier et al. |
| 2023/0192464 A1 | 6/2023 | Boroni et al. |
| 2023/0195293 A1 | 6/2023 | Kobel et al. |
| 2023/0196688 A1 | 6/2023 | Kobel et al. |
| 2023/0224680 A1 | 7/2023 | Kobel et al. |

(56) References Cited

U.S. PATENT DOCUMENTS

| | | |
|---|---|---|
| 2023/0226394 A1 | 7/2023 | Betz et al. |
| 2023/0227040 A1 | 7/2023 | Linsmeier et al. |
| 2023/0234498 A1 | 7/2023 | Linsmeier |
| 2023/0241968 A1 | 8/2023 | Linsmeier et al. |
| 2023/0247390 A1 | 8/2023 | Kobel et al. |
| 2023/0278531 A1 | 9/2023 | Betz et al. |
| 2023/0294915 A1 | 9/2023 | Koga et al. |
| 2023/0303321 A1 | 9/2023 | Koga et al. |
| 2023/0358020 A1 | 11/2023 | Kobel et al. |
| 2023/0368281 A1 | 11/2023 | Kobel et al. |
| 2023/0371100 A1 | 11/2023 | Kobel et al. |
| 2023/0416065 A1 | 12/2023 | Betz et al. |
| 2023/0417899 A1 | 12/2023 | Kobel et al. |
| 2024/0001764 A1 | 1/2024 | Koga et al. |
| 2024/0035254 A1 | 2/2024 | Linsmeier et al. |
| 2024/0042962 A1 | 2/2024 | Archer et al. |
| 2024/0043253 A1 | 2/2024 | Kobel et al. |
| 2024/0051807 A1 | 2/2024 | Yutzy et al. |
| 2024/0058634 A1 | 2/2024 | Linsmeier et al. |
| 2024/0059121 A1 | 2/2024 | Linsmeier et al. |
| 2024/0059136 A1 | 2/2024 | Linsmeier et al. |
| 2024/0059137 A1 | 2/2024 | Linsmeier et al. |
| 2024/0059151 A1 | 2/2024 | Linsmeier et al. |
| 2024/0059190 A1 | 2/2024 | Linsmeier et al. |
| 2024/0063457 A1 | 2/2024 | Linsmeier et al. |
| 2024/0063470 A1 | 2/2024 | Linsmeier et al. |
| 2024/0073651 A1 | 2/2024 | Kobel et al. |
| 2024/0075327 A1 | 3/2024 | Betz et al. |
| 2024/0075815 A1 | 3/2024 | Koga et al. |
| 2024/0075908 A1 | 3/2024 | Archer et al. |
| 2024/0089707 A1 | 3/2024 | Kobel et al. |
| 2024/0089708 A1 | 3/2024 | Kobel et al. |
| 2024/0149085 A1 | 5/2024 | Archer et al. |
| 2024/0149086 A1 | 5/2024 | Linsmeier |
| 2024/0149087 A1 | 5/2024 | Archer et al. |
| 2024/0149088 A1 | 5/2024 | Archer et al. |
| 2024/0149089 A1 | 5/2024 | Archer et al. |
| 2024/0149658 A1 | 5/2024 | Archer et al. |
| 2024/0149659 A1 | 5/2024 | Archer et al. |
| 2024/0149708 A1 | 5/2024 | Archer et al. |
| 2024/0149709 A1 | 5/2024 | Archer et al. |
| 2024/0149710 A1 | 5/2024 | Newlin et al. |
| 2024/0149711 A1 | 5/2024 | Archer et al. |
| 2024/0149715 A1 | 5/2024 | Archer et al. |
| 2024/0149806 A1 | 5/2024 | Archer et al. |
| 2024/0149807 A1 | 5/2024 | Archer et al. |
| 2024/0149808 A1 | 5/2024 | Archer et al. |
| 2024/0149815 A1 | 5/2024 | Archer et al. |
| 2024/0149864 A1 | 5/2024 | Linsmeier |
| 2024/0149948 A1 | 5/2024 | Archer et al. |
| 2024/0149965 A1 | 5/2024 | Archer et al. |
| 2024/0153371 A1 | 5/2024 | Brulo et al. |
| 2024/0153674 A1 | 5/2024 | Archer et al. |
| 2024/0161437 A1 | 5/2024 | Kobel |
| 2024/0190395 A1 | 6/2024 | Linsmeier et al. |
| 2024/0209688 A1 | 6/2024 | Betz et al. |
| 2024/0360651 A1* | 10/2024 | Sasazaki ............... E02F 9/261 |

FOREIGN PATENT DOCUMENTS

| | | |
|---|---|---|
| EP | 3 723 053 A1 | 10/2020 |
| EP | 3 779 677 A1 | 2/2021 |
| WO | WO-2022/155520 A1 | 7/2022 |
| WO | WO-2022/225791 A1 | 10/2022 |

OTHER PUBLICATIONS

International Search Report and Written Opinion issued in connection with PCT/US2024/019095 dated Jun. 18, 2024, 13 pps.
International Search Report and Written Opinion issued in connection with PCT/US2024/019120 dated Jun. 18, 2024, 12 pps.
International Search Report and Written Opinion issued in connection with PCT/US2024/019125 dated Jun. 18, 2024, 13 pps.
International Search Report and Written Opinion issued in connection with PCT/US2024/019141 dated Jun. 18, 2024, 15 pps.
International Search Report and Written Opinion issued in connection with PCT/US2024/019174 dated Jun. 18, 2024, 17 pps.
International Search Report and Written Opinion issued in connection with PCT/US2024/019216 dated Jun. 19, 2024, 13 pps.
International Search Report and Written Opinion issued in connection with PCT/US2024/019218 dated Jul. 1, 2024, 26 pps.
International Search Report and Written Opinion issued in connection with PCT/US2024/019220 dated Jul. 1, 2024, 30 pps.
International Search Report and Written Opinion issued in connection with PCT/US2024/019222 dated Jun. 12, 2024, 26 pps.
International Search Report and Written Opinion issued in connection with PCT/US2024/019229 dated Jul. 12, 2024, 13 pps.
International Search Report and Written Opinion issued in connection with PCT/US2024/019235 dated Jul. 12, 2024, 15 pps.

* cited by examiner

SYSTEM AND METHOD FOR CONDITIONAL DATA REPORTING

CROSS-REFERENCE TO RELATED APPLICATIONS

This application claims the benefit of and priority to (i) U.S. Provisional Application No. 63/451,342, filed on Mar. 10, 2023, (ii) U.S. Provisional Application No. 63/451,351, filed on Mar. 10, 2023, (iii) U.S. Provisional Application No. 63/451,387, filed on Mar. 10, 2023, (iv) U.S. Provisional Application No. 63/451,390, filed on Mar. 10, 2023, (v) U.S. Provisional Application No. 63/489,533, filed on Mar. 10, 2023, (vi) U.S. Provisional Application No. 63/451,504, filed on Mar. 10, 2023, (vii) U.S. Provisional Application No. 63/489,562, filed on Mar. 10, 2023, (viii) U.S. Provisional Application No. 63/451,506, filed on Mar. 10, 2023, (ix) U.S. Provisional Application No. 63/489,531, filed on Mar. 10, 2023, (x) U.S. Provisional Application No. 63/489,538, filed on Mar. 10, 2023, (xi) U.S. Provisional Application No. 63/489,558, filed on Mar. 10, 2023, and (xii) U.S. Provisional Application No. 63/489,560, filed on Mar. 10, 2023, each of which is hereby incorporated by reference herein in its entirety.

BACKGROUND

Work equipment such as lifts and telehandlers sometimes require tracking, tasking, monitoring, and servicing at a work site. Managers and operators of working machines typically rely on discrete systems, applications, and methods to perform these functions for each piece of equipment. Often, physical inspection of a machine is necessary to determine a state, status, or condition of the machine. Additionally, on work sites encompassing a large area or involving many pieces of equipment, it is often time consuming for equipment operators or service technicians to determine the statuses for a large number of machines prior to assigning a machine to a task.

SUMMARY

In some aspects, the techniques described herein relate to a system for conditional data reporting, the system includes a connectivity module, the connectivity module communicatively and physically coupled to a work machine; one or more processing circuits configured to generate a profile corresponding to the connectivity module and the work machine, the one or more processing circuits including one or more memory devices coupled to one or more processors, the one or more memory devices configured to store instructions thereon that, when executed by the one or more processors, cause the one or more processors to: generate the profile corresponding to the work machine and the connectivity module, the profile initially including a base state; receive data indicative of one or more functionalities of the work machine; populate, after receiving the data indicative of the one or more functionalities of the work machine, the profile with entries that define a machine-specific state of the profile that facilitates data interpretation and collection related to the one or more functionalities of the work machine; and send the profile including the machine-specific state to the connectivity module.

In some aspects, the techniques described herein relate to a system, wherein the base state of the profile is agnostic to at least one of a work machine type, one or more work machine components, or a work machine communication mode; and the base state includes one or more of a profile name, a profile identification number, or a serial number associated with at least one of the work machine or the connectivity module.

In some aspects, the techniques described herein relate to a system, further including at least one of a user device, a remote device, a computer system, or a controller configured to send a message including the data indicative of the one or more functionalities of the work machine to the one or more processing circuits.

In some aspects, the techniques described herein relate to a system, wherein: the at least one user device, remote device, computer system, or controller includes at least one of a cellular device, a tablet, a laptop, or a scanner configured to capture an image or receive an OCR input; and the data indicative of the one or more functionalities of the work machine includes at least one of an identification of a component associated with the work machine, an image of the component associated with the work machine, a serial number, a part number, or a software identifier.

In some aspects, the techniques described herein relate to a system, wherein: the machine-specific state includes at least one of a list of components equipped to the work machine, data indicating a quality of a specific component equipped to the work machine, an expected data format associated with the one or more functionalities of the work machine, a communication protocol corresponding to the one or more functionalities of the work machine, a sensor type equipped to the work machine, a specific part number of a part of the work machine, or a software version associated with the work machine.

In some aspects, the techniques described herein relate to a system, wherein the connectivity module is configured to: collect and interpret data received from the work machine via the profile including the machine-specific state; and communicate the data received from the work machine to a fleet connectivity system via the profile including the machine-specific state.

In some aspects, the techniques described herein relate to a system, wherein the one or more memory devices are configured to store instructions thereon that, when executed by the one or more processors, further cause the one or more processors to: update the profile, in response to receiving additional communications indicative of one or more additional and/or removed functionalities associated with the work machine; and wherein updating the profile includes revising the machine-specific state to add, remove, and/or revise: an entry from the list of components equipped to the work machine, data indicating the quality of the specific component equipped to the work machine, the expected data format associated with the one or more functionalities of the work machine, the communication protocol corresponding to the one or more functionalities of the work machine, the sensor type equipped to the work machine, the specific part number of the part of the work machine, or the software version associated with the work machine.

In some aspects, the techniques described herein relate to a system for conditional data reporting, the system including: one or more processing circuits including one or more memory devices coupled to one or more processors, the one or more memory devices configured to store instructions thereon that, when executed by the one or more processors, cause the one or more processors to: communicate across a network by sending messages to a connectivity module, a work machine, and a remote device each communicatively connected to the network; receive from the remote device, via the network, a message including data indicative of one or more functionalities of the work machine; generate, in response to receiving the message including the data indicative of the one or more functionalities of the work machine, a profile corresponding to the work machine and the connectivity module, the profile including a base state; modify the profile and the base state such that the profile includes a machine-specific state, the machine-specific state including data entries that facilitate data interpretation and collection related to the one or more functionalities of the work machine; and send the profile including the machine-specific state to the connectivity module.

In some aspects, the techniques described herein relate to a system, wherein: the base state of the profile is agnostic to at least one of a work machine type, one or more work machine components, or a work machine communication mode; and the base state includes one or more of a profile name, a profile identification number, or an identifier associated with at least one of the work machine or the connectivity module.

In some aspects, the techniques described herein relate to a system, wherein the data indicative of one or more functionalities of the work machine includes at least one of: a serial number, a customer number, a model number, a software number, or an identifier of specific equipment, parts, sensors, or software packages associated with the work machine.

In some aspects, the techniques described herein relate to a system, further including: a database storing data therein including one or more of an expected serial number, an expected customer number, an expected model number, an expected software number, or an expected identifier of specific equipment, parts, sensors, or software packages available for association with at least one work-machine-connectivity-module pair; wherein: the work machine and the connectivity module form a work-machine-connectivity-module pair; the one or more memory devices are configured to store instructions thereon that, when executed by the one or more processors, further cause the one or more processors to: compare the data indicative of the one or more functionalities of the work-machine-connectivity-module pair with the data stored in the database; confirm, based on the comparison, that the data indicative of the one or more functionalities of the work-machine-connectivity-module pair is legitimate; and modify at least one machine-specific profile to associate or disassociate the data stored in the database with the at least one work-machine-connectivity-module pair.

In some aspects, the techniques described herein relate to a system, wherein: the machine-specific state includes at least one of a list of components equipped to the work machine, data indicating a quality of a specific component equipped to the work machine, an expected data format associated with the one or more functionalities of the work machine, a communication protocol corresponding to the one or more functionalities of the work machine, a sensor type equipped to the work machine, a specific part number of a part of the work machine, or a software version associated with the work machine.

In some aspects, the techniques described herein relate to a system, wherein the connectivity module is configured to: collect and interpret data received from the work machine via the profile including the machine-specific state; and send the data received from the work machine to a fleet connectivity system via the profile including the machine-specific state.

In some aspects, the techniques described herein relate to a system, wherein the one or more memory devices are configured to store instructions thereon that, when executed by the one or more processors, further cause the one or more processors to: update the profile, in response to receiving additional communications indicative of one or more additional and/or removed functionalities associated with the work machine; and wherein updating the profile includes revising the machine-specific state to add, remove, and/or revise: an entry from the list of components equipped to the work machine, the data indicating the quality of the specific component equipped to the work machine, the expected data format associated with the one or more functionalities of the work machine, the communication protocol corresponding to the one or more functionalities of the work machine, the sensor type equipped to the work machine, the specific part number of the part of the work machine, or the software version associated with the work machine.

In some aspects, the techniques described herein relate to a method for conditional data reporting, the method including: providing a work machine and a connectivity module; generating, by one or more processing circuits, a profile corresponding to the work machine and the connectivity module, the profile including a base state; receiving, by the one or more processing circuits, data indicative of one or more functionalities of the work machine; after receiving the data indicative of the one or more functionalities of the work machine, modifying, by the one or more processing circuits, the profile to include entries that define a machine-specific state of the profile that facilitates data interpretation and collection related to the one or more functionalities of the work machine; and sending the profile including the machine-specific state to the connectivity module.

In some aspects, the techniques described herein relate to a method, further including collecting and interpreting, by the one or more processing circuits and via the profile including the machine-specific state, data acquired by the work machine.

In some aspects, the techniques described herein relate to a method, further including: in response to receiving additional communications indicative of one or more additional and/or removed functionalities associated with the work machine, updating the profile by the one or more processing circuits; and wherein updating the profile includes revising the machine-specific state to add, remove, and/or revise: an entry from a list of components equipped to the work machine, data indicating a quality of a specific component equipped to the work machine, an expected data format associated with the one or more functionalities of the work machine, a communication protocol corresponding to the one or more functionalities of the work machine, a sensor type equipped to the work machine, a specific part number of a part of the work machine, or a software version associated with the work machine.

In some aspects, the techniques described herein relate to a method, further including: comparing, by the one or more processing circuits, the data indicative of the one or more functionalities of the work machine with data stored in a database; confirming, by the one or more processing circuits and based on the comparison, that the data indicative of the one or more functionalities of the work machine is legitimate; modifying at least one machine-specific profile to associate or disassociate the data stored in the database with at least one work machine and at least one connectivity module; and wherein: the data stored in the database includes one or more of an expected serial number, an expected customer number, an expected model number, an expected software number, or an expected identifier of specific equipment, parts, sensors, or software packages available for association with at least one work-machine-connectivity-module pair.

In some aspects, the techniques described herein relate to a method, further including communicating data received from the work machine to a fleet connectivity system via the profile including the machine-specific state.

In some aspects, the techniques described herein relate to a method, further including: receiving, by the one or more processors, a message including the data indicative of the one or more functionalities of the work machine; and wherein: the message includes at least one of an identification of a component associated with the work machine, an image of the component associated with the work machine, a serial number, a part number, or a software identifier acquired via OCR.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
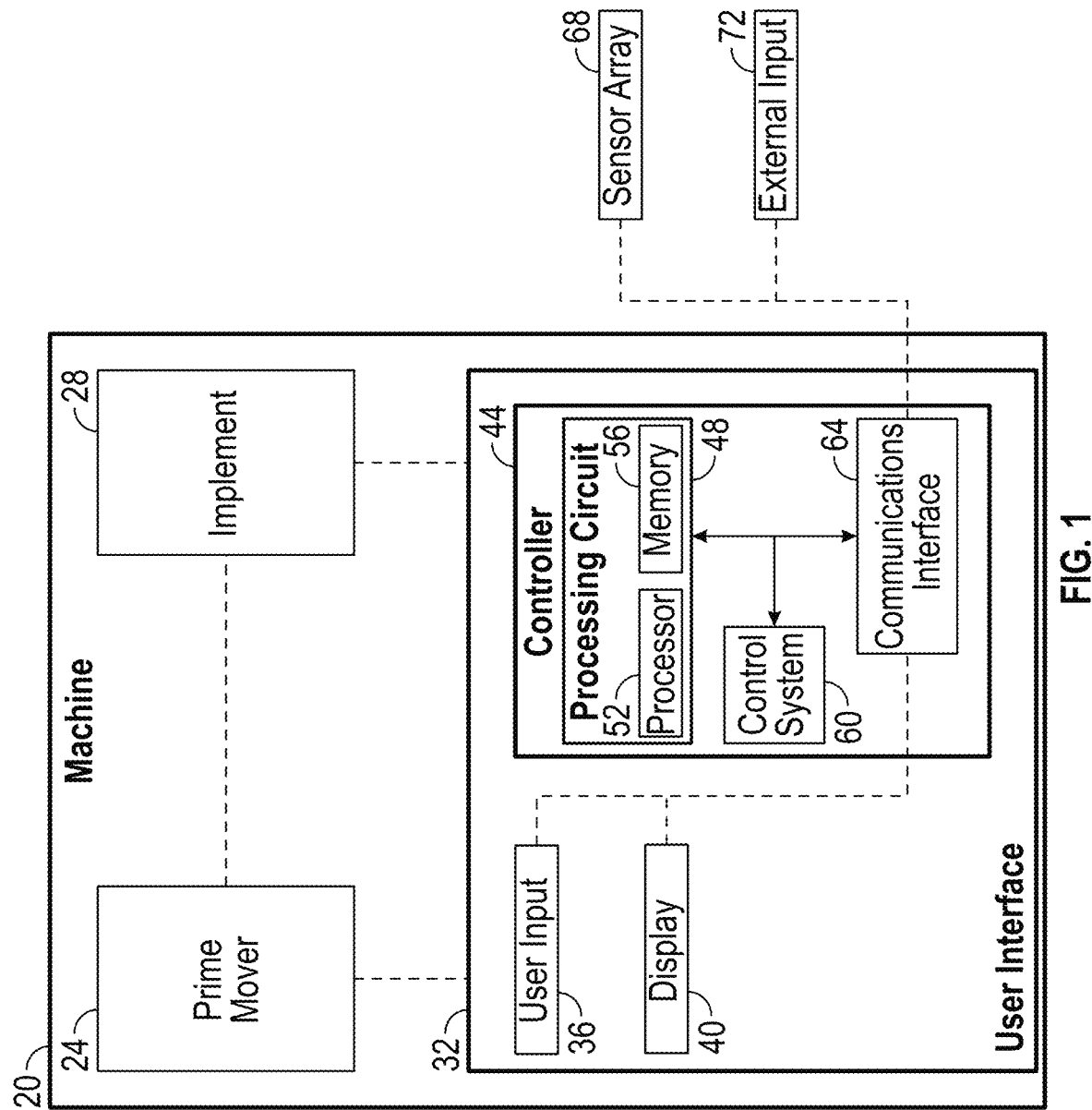
FIG. 1 is a schematic representation of a work machine including a machine control module, according to some embodiments.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, various exemplary embodiments disclosed herein relate to systems and methods for conditional data reporting. In some embodiments, the system for conditional data reporting is interoperable with a system for device association and provisioning. For example, the system for conditional data reporting may provide improvements, increase efficiency, or otherwise work in conjunction with the system for device association and provisioning. In some embodiments, a connectivity module may be configured with various components (e.g., a telematics control unit, a multi-function light beacon, one or more multi-channel communication modems, etc.), and may be programmed to support, send, receive, analyze, and/or store data associated with a work machine and equipment attached thereto. The connectivity module may further allow for association between a work machine, a component of the work machine (e.g., an LED beacon, a work machine light, an interface, a control system, a wheel, a sensor, a data collection tool, etc.), a subsystem of the work machine, etc. and a virtual profile, database, or management system representative of a particular connectivity module and work machine pair.

The systems and methods for conditional data reporting, for example, provide a control interface and provide structure for the process of connecting a connectivity module to a work machine (e.g., a communicatively coupled connectivity module and work machine pair). In some embodiments, a particular connectivity module and work machine to be linked/associated with one another may be identified (e.g., via activating an audio or visual indication, instructing the machine to turn on its lights or honk its horn, lighting a beacon on the machine, etc.). Before pairing the connectivity module to the work machine (e.g., tying the connectivity module serial number to the work machine serial number), the connections/interoperability between the connectivity module and work machine may be evaluated (e.g., troubleshooting) to ensure compatibility between the two (e.g., connectivity module has enough power, CAN, cellular, WiFi, BLE, GPS systems functional, etc.). Some errors in the troubleshooting process may be bypassed, while others may result in terminating the process and failure or repeat of the process to pair the connectivity module to the work machine. The connectivity module and work machine may be paired, and the system for conditional data reporting may generate a respective virtual profile, twin, file, or account associated with the pairing. Applications interacting with the system (e.g., on a mobile device) may take photographs of machine parts, serial numbers, sub-systems and the like to associate with the connectivity module/work machine pairing (e.g., identify to a remote system that a certain work machine and connectivity module pair is equipped with a pressure sensor with a serial number XX-XXX-XXXX, is equipped with an engine having a certain horsepower and fuel capacity, is equipped with a lift capable of lifting a certain load, is equipped with a cab/door/railing having certain dimensions, etc.). Optical character recognition (OCR) may capture the serial numbers or identifiers associated with machine parts, subsystems, etc. and link the respective part with the connectivity module/work machine pair.

In some aspects, the system for conditional data reporting provides a connection between a work machine, a paired connectivity module, work machines sensors, work machine software, etc. and the cloud (e.g., a virtual database, remote server, etc.). In this way, the system for conditional data reporting may generate a file or profile related to each work machine that enables various components in a fleet connectivity network to communicate and interoperate. For example, the system for conditional data reporting may receive signals from a work machine indicating specific serial numbers, model numbers, software versions, sensor packages, etc. currently operative or installed on the work machine. The system may then generate a file or profile to associate with the work machine and/or connectivity module pair and the various sensors, components, etc. attached thereto. For example, the file as initially generated might be of a uniform nature with only limited base qualities. However, the file may be populated with expected data entries, additional data entries, customized modules, new programs, particularized communication channels, protocols, and configurations needed to interact or interoperate with the particular work machine and respective sensors, software packages, tools, components, etc. thereon. The file may be built up from the starting file based on the specific communications and data received from the work machine and connectivity module, or from other work machines and connectivity modules communicating with the work machine and connectivity module. The profile may then be sent from the system (e.g., sent from the cloud, virtual storage, remote server) to a component of the fleet connectivity system (e.g., the connectivity module, the work machine memory, etc.) and instruct the component on how to communicate/operate with the work machine. The system for conditional data reporting may utilize a signal mapping interface tool (SMIT) to generate files/profiles related to work machines as the data/equipment/features associated with the machine are reported to the cloud. Thus, instead of maintaining large files associated with every possible combination of work machine, connectivity module, pair, sensor, equipment, software package, etc., the file for each individual sensor module, work machine, pair, etc. may be generated in a piecemeal or ad hoc fashion, may be generated based on data directly received from that work machine or from work machines communicating with that work machine, or may generated in a customized manner. Thus, the system for conditional data reporting eliminates the need to locally store large files and provides cloud-based file generation that informs connectivity modules and components of fleet connectivity systems of what data to collect, read, interpret, etc.

In some aspects, the system for conditional data reporting may update a profile or file associated with a connectivity module and/or work machine based on repeated communications sent/received from the work machine, connectivity module, over a network, etc. For example, a user may wish to add or associate a particular part (e.g., a wheel, axel, sensor, software update, or the like) with a work machine and connectivity module pair. The user may manually confirm the results of OCR pairing (e.g., confirming a prompt/query that predicts, based on the OCR result, that the part intended to be paired is a certain part (e.g., wheel, axel assembly, scissor lift, sensor, etc.). Scanned, paired, and associated devices, serial numbers, connectivity modules, work machines, etc. may then be uploaded to the cloud. The cloud may verify whether the serial numbers are valid (e.g., confirms whether the serial number of a connectivity module is associated with a known connectivity module to prevent the installation of third-party or data-skimming product, to confirm that a machine part matches an expected part in inventory or serial number known to be in inventory, to confirm that a connectivity module serial number is being paired with a machine associated with an expected customer code/number, etc.). The system may also (via the cloud) confirm that the serial number matches a correct customer number intended to receive or be associated with the serial number on the work machine, connectivity module, machine part, etc. In this way, work machines, parts, systems, connectivity modules, and customers can be linked to a virtual database, profile, or remote management system in a unified medium for easy tracking, monitoring, updating, and commissioning.

Further, the system for conditional data reporting may receive data sent to the cloud, generate or update a file identifying a work machine connectivity module pair, and broadcast back to the connectivity module the profile that facilitates the interpretation of the values corresponding to the part, sensor, software, component associated with or added to the work machine. For example, the profile sent by the system for conditional data reporting may instruct the connectivity module that input data received from a newly installed sensors will be pressure data, temperature data, and the like based on the system's generation of a profile upon receiving the serial number/model number of the sensor. Further, the profile may instruct the connectivity module that a work machine is equipped with a certain wheel, and that each revolution of the wheel equates to a certain distance. Similar functionalities may be used for software and the like (e.g., software version sent to the system for integration into a profile that facilitates communication). In this way, the system for conditional data reporting and profile generated therefrom may improve the data and information processed by the systems on the connectivity module and work machine pair.

In an exemplary embodiment, the connectivity module and a beacon are integrated into a single device. In some embodiments, the connectivity module includes other working components (e.g., one or more antennas, one or more power sources, one or more positioning systems, one or more local fleet connectivity processors, and one or more interface blocks, one or more machine connectivity provisions, one or more memory devices, GPS sensor, GPS antenna, GPS/GNSS sensors and/or antennas, a wireless transmitter, Bluetooth transmitter, Bluetooth antenna, WiFi module, WiFi antenna, cellular data transmitter, cellular data antenna, pressure transducer, light sensor, accelerometer, inertial measurement unit, memory storage, processor, multiple/colored LEDs, etc.). The systems and methods for device association and provisioning may troubleshoot, pair, and associate each respective connectivity module, system, module, etc. with a work machine to which the connectivity module is coupled. The work machine and connectivity module pair may further be uploaded to the cloud as a single virtual profile or twin. Connectivity modules may be removed from one work machine and repaired to another work machine, resulting in updated profiles, files, databases on the cloud. Further, the systems and methods for device association and provisioning may ensure that a serial number is not currently in use (e.g., was previously paired with a separate work machine but was moved to a different work machine). The system may prompt users to update the placement, association, and profiles related to one or more linked connectivity modules, work machines, machine systems, customer numbers, pairs, etc.

Further referring generally to the figures, various exemplary embodiments disclosed herein relate to systems and methods for conditional data reporting that may enhance local fleet connectivity. For example, systems and methods for conditional data reporting may be used to quickly integrate one or more work machines into a system for local fleet connectivity. Connectivity modules, work machines, and components associated with the systems and methods for conditional data reporting may be communicably coupled to other components of a fleet connectivity system (e.g., another work machine, a product development hub, a network, etc.). According to an exemplary embodiment, Bluetooth Low Energy (BLE) Machine to Machine (M2M) communication protocols may be used to expand communication at a worksite/jobsite via local connectivity between work machines at the worksite/jobsite (e.g., via low energy wireless data network, a mesh network, a satellite communications network, a cellular network, or a wireless data network, etc.). In some embodiments, a local fleet connectivity system may include various work machines, interface modules, work site equipment, communications devices, communications networks, user interface devices, devices hosting self-forming network software, and user interfaces. Local fleet connectivity system users may include equipment users, equipment maintainers, equipment suppliers, worksite/jobsite supervisors, remote users, etc. In some embodiments, interconnectivity and productivity related data is exchanged via the for system conditional data reporting. The connectivity module may be communicably connected to a work machine controller, host one or more connectivity and productivity applications, and/or communicate with other components of the fleet connectivity system. The information provided to the local fleet connectivity system may further be communicated to users via a user interface (e.g., via the system for conditional data reporting). In some embodiments, the user interface may include a real time map, showing a current machine location, a display showing a list of associated serial numbers, a GUI indicating results of connectivity module and work machine troubleshooting, etc.). In some embodiments, the user interface includes a color-coded warning indicator, an audible alarm, or another indicator structured to communicate to the machine operator that the work machine and connectivity module pair is in a location or state that requires the attention of the operator.

In some implementations, one or more machine identity and location services may generate a graphic display of a machine population. In some embodiments, the machine identity and location system graphic display may comprise a map of the machine population. In some embodiments, the graphic display of the machine population may be generated using one or more selectable dynamic filters. The one or more selectable dynamic filters may be applied to identify a particular machine population or sub-population at one or more work sites. The one or more selectable dynamic filter may perform filtering according to one or more selectable attributes. The one or more selectable attributes may comprise, for example, a machine type, a machine model number, a machine manufacturer, a machine location, a machine work site tag, a machine status, a fuel status, a use status, etc. In some embodiments, the machine identity system graphic display may be presented to a local user via a work site network. In some embodiments, the system for device association and provisioning graphic display may be presented to a remote user via one or more communications networks. In some instances, the remote user may remotely apply desired filters or configuration setting to the local fleet connectivity system graphic display presented to a local user on a local user interface device. In some embodiments, the graphic display filters or configuration setting may generate a one or more displays of the status or condition of work machines within a population of work machines in a combined view or in separate views.

In some embodiments, the system for conditional data reporting may indicate a status or condition of a work machine. The status or condition of a work machine may include, for example, a fuel level, an ignition on/off condition, a condition of movement, a state of charge status, a DTC status, a repair status, an indication of pairing success/failure, etc. Specifically, the system may receive data indicative of a machine's status, populate the data into a virtual profile, and report the profile back to one or more connectivity modules to indicate facilitate communication and data collection by the work machine. For example, if an additional sensor is installed on a work machine, data indicative of that sensor (e.g., a serial number, model number, etc.) may be sent to the system for conditional data reporting (e.g., via the cloud). The system may determine that the model number corresponds to a sensor that measures pressure, voltage, temperature, etc., or that the model number corresponds to a sensor utilizing a certain communication protocol. The system may update, populate, or generate the file associated with the work machine and broad cast ("kick back") the updated/generated profile to the fleet connectivity system, connectivity module, work machine, etc. In this way, the system via the updated profile may instruct the connectivity module, other components, other work machines, etc. to expect to receive data or communications from the newly installed sensor. Thus, rather than installing a connectivity module that is pre-programmed to interoperate with a specific sensor, the system for conditional data reporting allows the connectivity module and related components to be updated, instructed, modified to interoperable and become compatible with work machines as they change equipment, are repaired, receive new functionalities, etc.

As shown in FIG. 1, a work machine 20 (e.g., a telehandler, a boom lift, a scissor lift, etc.) includes a prime mover 24 (e.g., a spark ignition engine, a compression ignition engine, an electric motor, a generator set, a hybrid system, etc.) structured to supply power to the work machine 20, and an implement 28 driven by prime mover 24. In some embodiments, the implement 28 is a lift boom, a scissor lift, a telehandler arm, etc.

A user interface 32 is arranged in communication with the prime mover 24 and the implement 28 to control operations of the work machine 20 and includes a user input 36 that allows a machine operator to interact with the user interface 32, a display 40 for communicating to the machine operator (e.g., a display screen, a lamp or light, an audio device, a dial, or another display or output device), and a controller 44.

As the components of FIG. 1 are shown to be embodied in the work machine 20, the controller 44 may be structured as one or more electronic control units (ECU). The controller 44 may be separate from or included with at least one of an implement control unit, an exhaust after-treatment control unit, a powertrain control module, an engine control module, etc. In some embodiments, the controller 44 includes a processing circuit 48 having a processor 52 and a memory device 56, a control system 60, and a communications interface 64. Generally, the controller 44 is structured to receive inputs and generate outputs for or from a sensor array 68 and external inputs or outputs 72 (e.g., a load map, a machine-to-machine communication, a fleet management system, a user interface, a network, etc.) via the communications interface 64.

The control system 60 generates a range of inputs, outputs, and user interfaces. The inputs, outputs, and user interfaces may be related to a jobsite, a status of a piece of equipment, environmental conditions, equipment telematics, an equipment location, task instructions, sensor data, equipment consumables data (e.g. a fuel level, a condition of a battery), status, location, or sensor data from another connected piece of equipment, communications link availability and status, hazard information, positions of objects relative to a piece of equipment, device configuration data, part tracking data, text and graphic messages, weather alerts, equipment operation, maintenance, and service data, equipment beacon commands, tracking data, performance data, cost data, operating and idle time data, remote operation commands, reprogramming and reconfiguration data and commands, self-test commands and data, software as a service data and commands, advertising information, access control commands and data, onboard literature, machine software revision data, fleet management commands and data, logistics data, equipment inspection data including inspection of another piece of equipment using onboard sensors, prioritization of communication link use, predictive maintenance data, tagged consumable data, remote fault detection data, machine synchronization commands and data including cooperative operation of machines, equipment data bus information, operator notification data, work machine twinning displays, commands, and data, etc.

The sensor array 68 can include physical and virtual sensors for determining work machine states, work machine conditions, work machine locations, loads, and location devices. In some embodiments, the sensor array includes a GPS device, a LIDAR location device, inertial navigation, or other sensors structured to determine a position of the work machine 20 relative to locations, maps, other equipment, objects or other reference points. Each sensor may include an identifier (e.g., a serial number, product code, label, corresponding communication channel) that can be used to pair the specific sensor, machine, and connectivity module. The pairing may then be used to generate a profile unique to that particular machine (e.g., in the cloud, at a remote database, on the connectivity module, etc.). The profile may then be communicated to the connectivity module, work machine, etc. to facilitate data collection, update data collection, and allow the connectivity module or other components to communicate and interpret data (e.g., input data from sensors).

In one configuration, the control system 60 is embodied as machine or computer-readable media that is executable by a processor, such as processor 52. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control system 60 is embodied as hardware units, such as electronic control units. As such, the control system 60 may be embodied as one or more circuitry components including, but not limited to, processing circuitry, network interfaces, peripheral devices, input devices, output devices, sensors, etc. In some embodiments, the control system 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 60 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 60 may also include programmable hardware devices such as field programmable gate arrays, programmable array logic, programmable logic devices or the like. The control system 60 may include one or more memory devices for storing instructions that are executable by the processor(s) of the control system 60. The one or more memory devices and processor(s) may have the same definition as provided below with respect to the memory device 56 and processor 52. In some hardware unit configurations, the control system 60 may be geographically dispersed throughout separate locations in the machine. Alternatively, and as shown, the control system 60 may be embodied in or within a single unit/housing, which is shown as the controller 44.

In the example shown, the controller 44 includes the processing circuit 48 having the processor 52 and the memory device 56. The processing circuit 48 may be structured or configured to execute or implement the instructions, commands, and/or control processes described herein with respect to control system 60. The depicted configuration represents the control system 60 as machine or computer-readable media. However, as mentioned above, this illustration is not meant to be limiting as the present disclosure contemplates other embodiments where the control system 60, or at least one circuit of the control system 60, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 52) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., control system 60 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 56 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 56 may be communicably connected to the processor 52 to provide computer code or instructions to the processor 52 for executing at least some of the processes described herein. Moreover, the memory device 56 may be or include tangible, non-transient volatile memory or non-volatile memory. Accordingly, the memory device 56 may include database components, object code components, script components, or any other type of information structure for supporting the various activities and information structures described herein.

In an exemplary embodiment, the memory device 56 stores instructions for execution by the processor 52 for a process to automatically generate a work site equipment groupings. The process to automatically generate a work site equipment groupings automatically associates work machines 20 connected on a near network to one or more work machines 20. In some embodiments, the automatic associations are based on rule stored on a work machine or on another network node. In some embodiments, the association rules are based on one or more of a work site designation, a location of a machine, or a code (e.g., a customer key, a manufacturer key, or a maintainer key).

Figure 2:
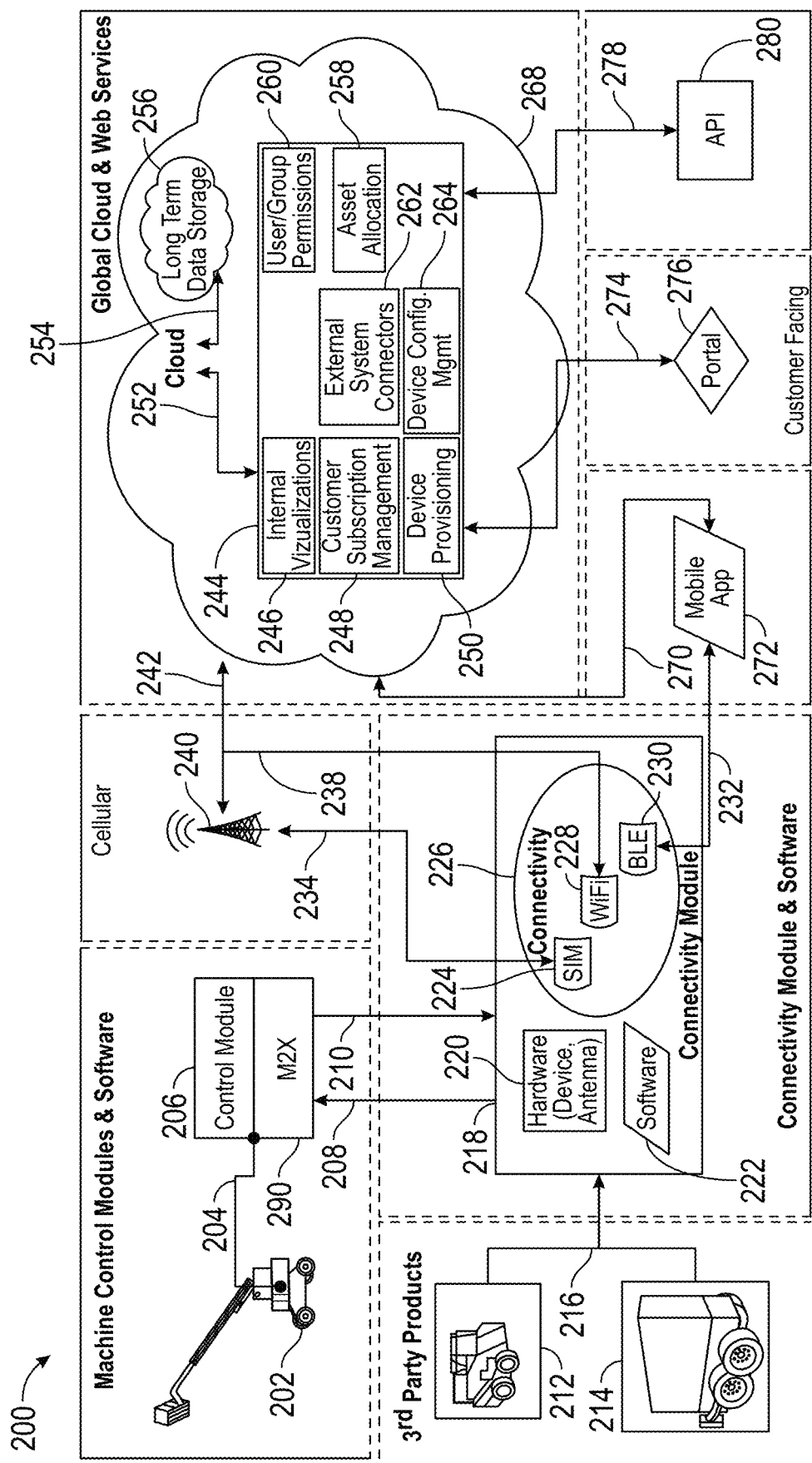
FIG. 2 is a schematic representation of a local fleet connectivity system, according to some embodiments.

As shown in FIG. 2, a system for fleet connectivity 200 is supported by a network of nodes. The system for fleet connectivity is interoperable with the system for conditional data reporting. The network of nodes may include one or more work machines 202, each with a controller 206, one or more connectivity modules 218, and one or more network devices hosting, for example, user devices 272, network portals 276, application interfaces/application programming interfaces 280, data storage systems 256, cloud and web services, profiles/files associated with work machines and their paired equipment, and product development tool and application hubs 244.

The work machine 202 is communicably connected to a controller 206. The connection between the work machine 202 and the controller 206 may be wired or wireless thus providing the flexibility to integrate the control module with the work machine 202 or to temporarily attach the controller 206 to the work machine 202. The controller 206 may be configured or may be reconfigurable in both hardware and software to interface with a variety of work machines 202, 212, 214 via the connectivity module 218. The controller 206 may comprise an integral power source or may draw power from the work machine 202 or another external source of power. Controllers 206 may be installed on or connected, e.g., via a connection 216, to products (e.g., third party work machines 212, 214) not configured by the original product manufacturer with a controller 206.

The work machine 202 communicably connects to the local fleet connectivity system 200 and the system for conditional data reporting via a machine-to-X (M2X) module 290. The M2X module 290 is communicably connected to the controller 206. The M2X module 290 establishes one or more communications channels 208, 210 with a connectivity module 218. The connectivity module 218 provides a plurality of links between one or more work machines 202, 212, 214, the local fleet connectivity system 200, and the system for conditional data reporting. Applications providing functions for the local fleet connectivity system 200 may be run by the M2X modules on one or more work machines 202 exchange commands, codes (e.g., a customer key) and data between work machines 202, 212, 214, and user devices 272, including user interfaces, to form a network of interconnections among machines, devices, or nodes. Connections between machines and user devices in the local fleet connectivity system may be provided by a wireless mesh network, for example.

The connectivity module 218 comprises hardware 220, further comprising antennas, switching circuits, filters, amplifiers, mixers, and other signal processing devices for a plurality of wavelengths, frequencies, etc., software hosted on a non-volatile memory components 222, and a communications manager 226. The communications manager 226 may comprise processing circuits with communications front ends 224, 228, and 230 for one or more signal formats and waveforms including, for example, Bluetooth, Bluetooth low energy, WiFi, cellular, optical, and satellite communications. The connectivity module 218 may function as a gateway device connecting work machine 202 to other work machines 212, 214, remote networks 244, 272, 276, and 280, beacons, cloud profiles, scheduling or other fleet management and coordination systems, and the system for conditional data reporting.

The local fleet connectivity system 200 allows for the coordination of multiple work machines 202, 212, 214 within the same work site, or a fleet wide control. For example, a work machine 202 may remotely report the results of a self-inspection to a user via a user device 272 (e.g., including a user interface).

The local fleet connectivity system 200 provides connectivity between work machines 202, 212, 214 and user devices 272 (with user interfaces), network portals 276, application interfaces/application programming interfaces 280, data storage systems 256, cloud and web services 268, and product development tool and application hubs 244 that function as an Internet of Things (IoT) system for operation, control, and support of work machines 202, 212, 214 and users of work machines. Product development tool and application hubs 244 may comprise tools and applications for internal visualizations 246, customer subscription management 248, device provisioning 250, external systems connectors 262, device configuration management 264, user/group permissions 260, asset allocation 258, fleet management, compliance, etc. Further, connections 232, 234, 238, 242, 252, 254, 270, 274, and 278 between nodes connected to the local fleet connectivity system 200 may comprise, for example, cellular networks (e.g., via cell towers 240), or other existing or new means of digital connectivity, which may connect work machines 202, 212, 214 to other components of the local fleet connectivity system 200, as discussed below.

Referring still to FIG. 2, the connectivity module 218 is communicably connected to a work machine controller (e.g., controller 206), and may communicate between the work machine 202, the system for conditional data reporting, and other components of the local fleet connectivity system 200. As will be discussed in greater detail below, in an exemplary embodiment the connectivity module 218 is integrated with an indicator (e.g., indicator 326 shown in FIG. 3, beacon 1212 shown in FIG. 12, etc.), which may be configured to provide an indication or signal that indicates a status of a machine or the identity of the machine (e.g., green for one machine, red for another, etc.). Also according to an exemplary embodiment, and as will be discussed in greater detail below, the connectivity module 218 may also be integrated with a telematics control unit, a multi-function indication system, one or more multi-channel communication modems, one or more analytics devices, one or more antennas, one or more power sources, one or more positioning systems, one or more local fleet connectivity processors, and one or more interface blocks, one or more machine connectivity provisions, one or more memory devices, and/or any other suitable component or device configured to connect components of the local fleet connectivity system 200. In this regard, the connectivity module 218 (e.g., with the integrated indicator 326, beacon 1212, etc.) may be configured to perform various functions, for example determine and provide an indication of a status of a machine, analyze and provide an indication relating to customer and/or commercial services, analyze and provide an indication relating to electronic services, analyze and provide an indication relating to machine configuration and location information, etc. The system for conditional data reporting may generate a profile associated with the work machine or associated with a pairing between the connectivity module 218 and the work machine 202 based on functionalities reported to the cloud via the connectivity module (e.g., serial numbers, model numbers, software version sent to the cloud/remote computer system/remote device).

According to an exemplary embodiment, the connectivity module 218 is integrated with an indicator (e.g., indicator 326 shown in FIG. 3, beacon 1212 shown in FIG. 12, etc.), and is configured to communicate with the work machine 202, the user device 272, and/or components of the application hub 244 (e.g., internal visualizations 246). The connectivity module 218 may be configured to receive data from the work machine 202 that represents a state or condition of the work machine 202, for example in response to a status request from a user of the user device 272, a request from the cloud and web services 268, and/or as a result of predetermined functionality of components of the work machine 202 (e.g., the controller 206). In an exemplary embodiment, the connectivity module 218 is configured to store the data (e.g., via a memory, etc.). Further, the connectivity module 218 may be configured to provide an indication or signal (e.g., via the indicator 326, beacon 1212, etc.) that indicates a status of the machine. For example, the connectivity module 218 (e.g., indicator 326, beacon 1212, etc.) may provide a visual indication (e.g. colored lights, for example white, red, blue, green, orange, etc.; patterned lights, for example solid, flashing, strobed, etc.; a light having varied optical characteristics, for example wavelength, intensity, pulse duration, direction, etc.; and/or any other suitable visual indication system or device), an audible indication (e.g., a noise, alarm, warning, message, etc.), a tactile signal (e.g., vibration, etc.), and/or any other suitable indication or signal (e.g., a message to the user device 272, an icon on an application, a message to the internal visualizations 246, etc.). According to an exemplary embodiment, the indication represents a state, condition, identify, or status of a machine. For example, the state or condition may include a fuel level of a machine, the status of a component of the machine (e.g., retracted, extended, open, closed, etc.), whether the machine has been paired or associated with a connectivity module/cloud profile, whether the machine is on or off, whether the machine is in operation or moving, a charge level of the machine, whether the machine is charging and/or charged, whether a machine requires a diagnostic check, a trouble shooting check, maintenance, DTC, characteristics of the machine (e.g., machine type, model, work site tag, etc.), etc. In an exemplary embodiment, the connectivity module 218 (via the indicator 326, beacon 1212, etc.) is configured to provide the status of a machine (e.g., via indicator 326, beacon 1212, etc.) to a user, observer, the user device 272, and/or the application hubs 244 (e.g., internal visualizations 246).

Also, according to an exemplary embodiment, the connectivity module 218, with the integrated indicator (e.g., indicator 326, beacon 1212, etc.), is also configured to communicate with the user device 272 and/or another component of the application hub 244 (e.g., customer subscription management 248). In an exemplary embodiment, the connectivity module 218 is configured to support, send, receive, analyze, and/or store data relating to customer and/or commercial services, for example from the customer subscription management 248 hub the user device 272, and/or another suitable source. In an exemplary embodiment, the connectivity module 218 receives advertising, user preference identification, point of sale, third-party messaging, etc. data relating to a customer and/or commercial services. The connectivity module 218 (e.g., via the indicator 326, beacon 1212, etc.) may also be configured to process the data and/or provide an indication (e.g., a visual indication via a display, via an interface on the user device 272, etc.) to a user or observer. For example, the connectivity module 218 may provide an indication that represents a recommended purchase for a user or customer (e.g., based on a state or condition of the machine, as discussed above), a point-of-sale service (e.g., an order entry, payment acceptance, order tracking, customer subscription management, etc.), and/or any other suitable commercial service.

In some embodiments, the connectivity module 218, with the integrated indicator (e.g., indicator 326, beacon 1212, etc.), is also configured to communicate with the user device 272, and/or another component of the application hub 244 (e.g., the device provisioning 250). In an exemplary embodiment, the connectivity module 218 is configured to support, send, receive, analyze, and/or store data relating to setting up, provisioning, updating, and/or commissioning a machine, for example from the device provisioning 250 hub, the user device 272, and/or another suitable source. For example, the connectivity module 218 may receive technology manual, service manual, parts manual, regulatory guidance document, marketing flyers, data relating to information that may be used in setting up, updating, and/or commissioning a work machine, etc. The connectivity module 218 (e.g., via the indicator 326, beacon 1212, etc.) may also be configured to process the data and/or provide an indication (e.g., a visual indication via a display, via an interface on the user device 272, etc.) to a user or observer. For example, the connectivity module 218 may provide an indication that represents that maintenance is required, a service technician should be called, a machine is operating in violation of a technical and/or regulatory requirement, etc. In some embodiments, the connectivity module 218 is also configured to receive data relating to software and/or technical updates relating to a machine and components thereof, for example from the device provisioning 250 hub, the user device 272, and/or another suitable source. In this regard, the connectivity module 218 may be configured to facilitate more efficient machine commissioning and/or updates by providing an integrated system that receives, process, and analyzes data, as well as provides indications relating to the machine to users and/or observers.

In an exemplary embodiment, the connectivity module 218, with the integrated indicator (e.g., indicator 326, beacon 1212, etc.), is further configured to communicate with the work machine 202, the user device 272, and/or yet another component of the application hub 244 (e.g., device configuration management 264). The connectivity module 218 may be configured to receive data from the work machine 202 (e.g., a sensor, the controller 206, etc.) that represents one or more pressures of one or more components of the work machine 202. In an exemplary embodiment, the pressure data may be used to determine various characteristics, statuses, conditions, states, etc. of the work machine 202. For example, the connectivity module 218 may receive pressure data from components of the work machine 202 (e.g., the controller 206), and the connectivity module 218 (and/or the controller 206) may use the pressure data to determine a position of the work machine 202 on a floorplan of a work site, on a network (e.g., a mesh network), a position relative to the user device 272, other work machines 212, 214, etc. In some embodiments, the connectivity module receives pressure data relating to one or more components of the work machine 202 (e.g., the chassis, platform, forks, a load, an implement, work site hub device, etc.), and determines a relative height of the work machine 202, an operational height of a component of the work machine 202 (e.g., a fork, platform, etc.), completes a safety check, performs an elevation verification and/or calculation, etc. The connectivity module 218 (e.g., via the indicator 326, beacon 1212, etc.) may also be configured to provide an indication (e.g., a visual indication, via an interface on the user device 272, etc.) relating to the positioning and/or configuration of the work machine 202 to a user or observer. For example, the connectivity module 218 may provide an indication that represents that a component of the work machine 202 is an unsafe height, the work machine 202 requires maintenance, etc. Although the connectivity module 218 is described herein as receiving data that represents one or more pressures, it is understood that any data may be received that relates to the positioning, orientation, and/or characteristics of the work machine 202 (e.g., temperature, speed, light, etc.). The ability of the connectivity module to interpret and determine status from such data may be due, in whole or part, to the profile generated by or communications received from the system for conditional data reporting.

In other embodiments, the connectivity module 218, with the integrated indicator (e.g., indicator 326, beacon 1212, etc.), is further configured to communicate with the user device 272, and/or yet another component of the application hub 244 (e.g., asset allocation 258). The connectivity module 218 may be configured to support, send, receive, analyze, and/or store data relating to electronic commerce services, for example from the asset allocation 258 hub, the user device 272, and/or another suitable source. In an exemplary embodiment, the connectivity module 218 receives original equipment manufacturer advertising (e.g., service kit, equipment consumable, replacement parts based on a status or condition of a machine, etc.), third party advertising, point of sale, etc. data relating to the commerce services of the work machine 202. The connectivity module 218 (e.g., via the indicator 326, beacon 1212, etc.) may also be configured to process the data and/or provide an indication (e.g., a visual indication via a display, via an interface on the user device 272, etc.) to a user or observer. For example, the connectivity module 218 may provide an indication that indicates a machine component in need of replacement (e.g., via a status indication, as discussed above), a sales channel that supports a sale, a local sales team that supplies the component in need of replacement, etc. The connectivity module may provide the indication based on interpreting or carrying out instructions contained on or guided by the profile or communications from the system for conditional data reporting.

As will be discussed in greater detail below, the connectivity module 218 (e.g., with the integrated indicator 326, beacon 1212, etc.) may be configured (e.g., by the system for conditional data reporting) to perform various functions, for example determine and provide an indication of a status of a machine, analyze and provide an indication relating to customer and/or commercial services, analyze and provide an indication relating to electronic services, analyze and provide an indication relating to machine configuration and location information, control one or more components of a work machine based on a criteria of the work machine, etc. While the connectivity module 218 is described herein as performing certain functions, it is understood that the connectivity module 218 may perform different and/or similar functions using additional, fewer, and/or different working components. The working components interacting with the connectivity module or compatible with the connectivity module may be updated or modified based on data communicated to and received from the system for conditional data reporting.

Figure 3:
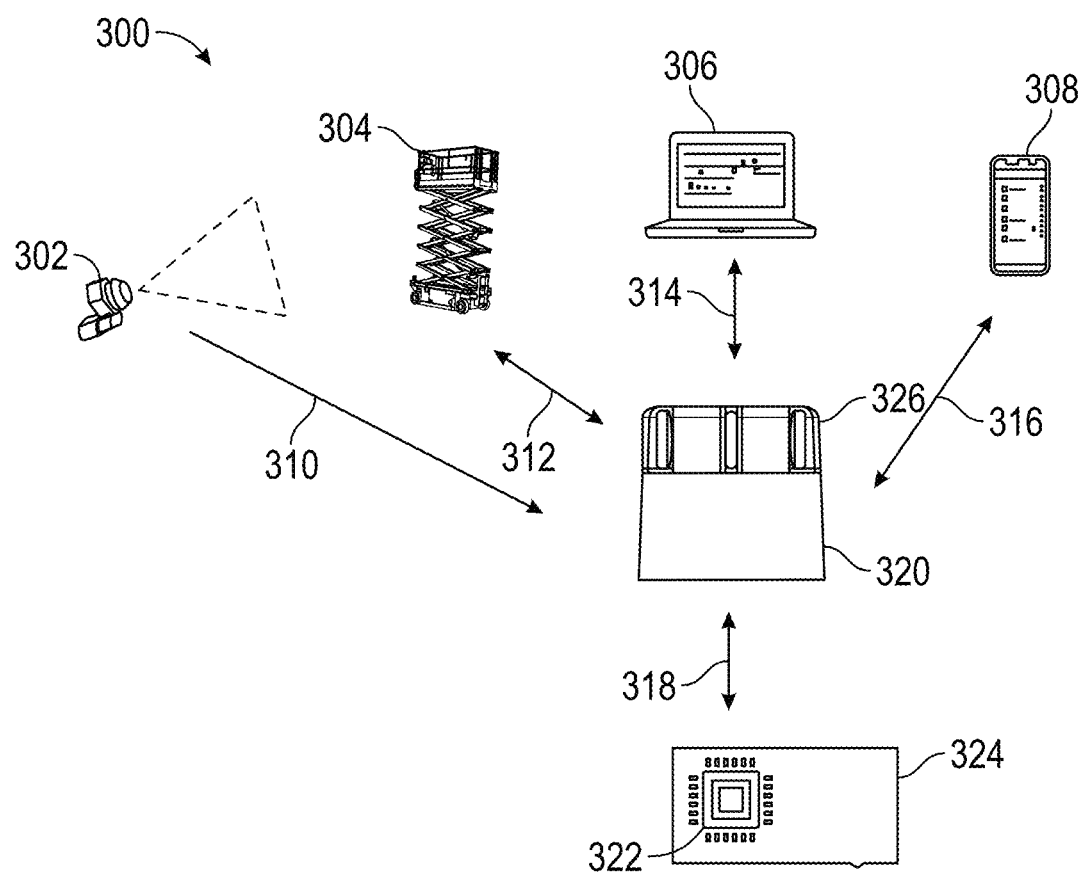
FIG. 3 is a schematic representation of a local fleet connectivity system with a connectivity module and an indicator, according to some embodiments.

Referring now to FIG. 3, a fleet connectivity system 300 is shown, according to an exemplary embodiment. In some embodiments, components of the fleet connectivity system 300 are integrated and/or combined with components of the fleet connectivity system 200 of FIG. 2. As shown in FIG. 3, a connectivity module 320 functions as a communications interface between a work machine 324 (e.g., a control system) and other components connected to the fleet connectivity system 300 (e.g., the system for conditional data reporting). As discussed above, the connectivity module 320 is integrated with the indicator 326, which may be beacon, light, display, and/or any other suitable device and/or system configured to provide an indication. In an exemplary embodiment, the connectivity module 320 is configured to exchange data with various components of the fleet connectivity system 300 (e.g., via wireless connection, Bluetooth, etc.). For example, the connectivity module 320 may exchange data 318 with a control system 322 of the work machine 324, data 316 with a user device 308 running an application for the fleet connectivity system 300, data 314 with a node or portal 306, data 312 with another work machine 304, sensor data 310 with auxiliary sensors 302, data with a connectivity hub configured to connect a plurality of machines to the fleet connectivity system 300, with the system for conditional data reporting, and/or any other suitable commands and/or data with another suitable working device or machine.

As shown in FIG. 3, the connectivity module 320 is integrated with the indicator 326, which is configured to provide an indication or signal to an observer. According to an exemplary embodiment, the indicator 326 is integrated with the connectivity module 320 and/or provides an indication as a mode of the fleet connectivity system 300; however, in other embodiments the indicator 326 is integrated with another component of the fleet connectivity system 300 and/or the work machine 324 (e.g., a vehicle external light, a vehicle internal light, a headlight, taillight, beacon, horn, etc.). In an exemplary embodiment, the indicator 326 is a visual indication device, for example a light (e.g., an incandescent light, a light emitting diode, a fixed beacon, a flashing beacon, a rotating beacon, a laser, a light array, etc.), a display device, a marker, etc. However, in other embodiments the indicator 326 incorporates other indications (e.g., an audible, tactile, electronic, etc. indication), which may be used in conjunction or independently of the visual indication. The indication may relate to a status of the work machine 324 (e.g., power on, power off, in operation, fuel level, electrical system state of charge, DTC, maintenance required, etc.).

According to an exemplary embodiment, the indicator 326 is configured to generate a variety of indications and/or signals, for example visual, audible, tactile, etc. signals. In some embodiments, the indications comprise one or more colors, patterns, and/or combinations of colors and patterns. The indicator 326 may generate visual signals observable as a light or one or more light patterns. In some embodiments, the light patterns generated by the indicator 326 are varied in any optical characteristic (e.g., color, wavelength, intensity, pulse duration, direction, etc.). In other embodiments, the indicator 326 is configured to generate an audible indicator (e.g., a noise, alarm, warning, message, etc.), a tactile signal (e.g., vibration, etc.), and/or any other suitable indicator or signal (e.g., a message to a user device, an icon on an application, etc.).

In an exemplary embodiment, the indications generated by the indicator 326 relate to various states, conditions, statuses, and/or criteria of the machine. For example, the indications may indicate that one or more machines on a work site that have sufficient fuel levels to perform a task. In other embodiments, the indications indicate predefined or user configurable machine states for a local identification of that state. For example, a work machine 324 can flash a beacon light indicating that it requires a charge. In some embodiments, the indication may be initiated in response to data 316 entered by a user at a user device 308, entered at the node or portal 306, a machine-to-machine command (e.g., another work machine 304), as a result of communication from the system for device association and provisioning, connectivity hub, etc.

According to an exemplary embodiment, the indicator 326 is configurable to function when work machine 324 is off (e.g., powered off, out of battery, out of fuel, etc.). The indicator 326 may be configured to receive input (e.g., sensor input from the work machine 324, user input from the user device 308, from the system for conditional data reporting, fleet input from the connectivity hub, etc.) via a Bluetooth low energy (BLE) signal received at the connectivity module 320. The BLE communications path can be configured to remain active with power input from another power source (e.g., a battery, etc.). In some embodiments, the BLE communications channel in the connectivity module 320 remains open, and the indicator 326 is available to display a signal in a power saving mode (e.g., modified receiver duty cycles, reduced communications/BLE intervals, lower power operation of the indicator 326, etc.).

As discussed above, in some embodiments onboard sensors detect a state or condition of the work machine 324. The control system 322 may provide data 318 to the connectivity module 320, and/or directly to the indicator 326, such that the indicator 326 may provide an indication representing a detected status of the work machine 324. In some embodiments, the indicator 326 illuminates a colored light to provide a signal corresponding to a selected machine status. For example, a work site supervisor may select green to indicate a fuel level above ¾ of capacity, yellow to indicate a fuel level between ¾ and ¼, and red to indicate a fuel level below ¼. In addition, a service technician may transmit a wireless command to all machines on a work site to flash a red light if the control system 322 determines a battery charge below a specified level.

Also as discussed above, in some embodiments the user device 308 hosts an application that allows a user to receive an indication (e.g., via a user interface, etc.). In an exemplary embodiment, a user selects a criterion for a machine status and a visual indicator corresponding to the criterion via the application. For example, a user may select state of charge as a criterion for electric powered scissor lift machines (e.g., the other work machine 304) on a work site, and one or more state visual indicator signals (e.g., a colored light) corresponding to one or more state of charge conditions. The user input may be transmitted to work machines 304, 324 via a network, which may be received by the connectivity module 320 (and/or the integrated indicator 326). The connectivity module 320 (and/or the indicator 326) may process the input, determine a status of the other work machine 304, and/or provide an indication relating to the status of the machine. For example, each indicator 326 of the machines at the work site may display a light beacon with a color representing a status of that machine (e.g., machines with good charges show green lights, machines requiring a recharge show yellow lights, and machines requiring battery replacement show red lights.).

In some embodiments, components of the fleet connectivity system 300 (e.g., the user device 308 and/or the application, etc.) are also configured to support fleet identification functions. For example, one or more applications (e.g., on the connectivity module 320 with the integrated indicator 326, the user device 308, etc.) may be configured to receive, store, process, and/or provide machine status data and/or indications relating to one or more machines in a fleet. The one or more machines in a fleet may be communicably connected (e.g., directly using a mesh, WiFi, or other local connection or remotely via a cloud network connection), so as to communicate with components of the fleet connectivity system 300, as discussed above. Further, in an exemplary embodiment the one or more work machines (e.g., the work machine 324, the other work machine 304) are each configured with a connectivity module 320 (and an indicator 326). According to an exemplary embodiment, a user selects a desired machine status in the application (e.g., on the user device 308 via a "find me" application), and the user input is transmitted to the work machines 304, 324 (e.g., the connectivity modules 320) in the fleet. Each work machine in the fleet may process the input, determine the status of the machine, and/or provide an indication of the status of the machine (e.g., simultaneously), as discussed above. According to an exemplary embodiment, the connectivity modules 320 (e.g., the indicators 326) may provide an indication (e.g., lights, horns, etc.) to allow a user to distinguish the statues of machines and/or identify machines of suitable status quickly. Further, the connectivity modules 320 (e.g., the indicators 326) may also provide an indication to the application, which may be presented to the user in a graphical user interface (e.g., a digital map, etc.) in order to allow a user to observe the statuses of a group of machines at a work site via the user device 308. In some embodiments, the user may select (e.g., via the graphical user interface of the user device 308) a digital representation of the work machine in the digital map, and control and/or observe condition of the work machine. Further, a user may selectively filter the condition, states, statues, and/or criteria of the desired work machines in a fleet in the application, for example via machine states (fully charged, at least ½ fuel, no outstanding service issues, no faults detected on self-test, etc.), machine type (e.g. specific make, specific model, etc.), machine location (e.g. proximity to the user, proximity to a task, positioned for easiest movement out of a staging area, etc.), and/or any other suitable criteria. According to an exemplary embodiment, the connectivity modules 320, the indicators 326, the control systems 322 and/or the application may store the data relating to each status request and/or user input (e.g., including machine serial numbers, service records, machine location, electronic commerce data, use tracking data, billing data, maintenance support data, etc.).

In some embodiments, components of the fleet connectivity system 300 (e.g., the user device 308 and/or the application, etc.) are also configured to support commercial services, as discussed above. For example, one or more hosted applications (e.g., on one or more processors, the control system 322, the connectivity module 320 with the integrated indicator 326, the user device 308, etc.) may be configured to receive, store, process, and/or provide advertising, user preference identification, point of sale, third-party messaging, etc. data and/or indications. In an exemplary embodiment, the connectivity module 320 (and/or the indicator 326) is configured to provide an indication relating to commercial services to the application, such that the application may generate user interfaces having icons or messages (e.g., via the user device 308, a display, etc.), one or more of audio, visual, and/or tactile signals to convey messages, and/or any other suitable indication. For example, the application may display recommended purchases to the user based on a machine status connected to the fleet connectivity system 300, a parameter (e.g., a machine price, etc.) associated with a machine of the fleet connectivity system 300, a point-of-sale service (e.g., order entry, payment acceptance, order tracking, etc.), of the fleet connectivity system 300, etc.

In other embodiments, components of the fleet connectivity system 300 (e.g., the user device 308 and/or the application, etc.) are also configured to support commerce functions, as discussed above. For example, one or more applications (e.g., on the connectivity module 320 with the integrated indicator 326, the user device 308, etc.) may be configured to receive, store, process, and/or provide original equipment manufacturer advertising (e.g., service kit, equipment consumable, replacement parts based on a status or condition of a machine, etc.) data and/or indications. In an exemplary embodiment, the connectivity module 320 (and/or the indicator 326) is configured to provide an indication relating to commerce functions to the application. For example, the connectivity module 320 (and/or the indicator 326) may provide an indication (e.g., message) based on a specific machine or machines being accessed, a profile or a nature of a person accessing the specific machine or machines, weather or local conditions around the machine or machines, conditions or states associated with the machine (e.g., engine hours, fault codes, etc.), location of the machine, location of the work site, proximity of a vendor to a work site, etc. In other embodiments, the connectivity module 320 (and/or the indicator 326) may provide indications (e.g., messages) that include a point-of-sale interface (e.g., portal) that allows an original equipment manufacturer (OEM) to determine a component that needs to be replaced (e.g., based on the status of the component determined via sensors, as discussed above). Further, the connectivity module 320 (and/or the indicator 326) may provide indications (e.g., messages, interfaces, etc.) that allow an OEM to locate the nearest replacement part, determine a price and delivery time for the part, provide a message to a user on the user device 308 identifying the need to replace the component, the price and arrival time for the replacement component, a purchase incentive for ordering the component through the application, process the order through the user device, and/or provide post sale services (e.g. delivery status, installation instructions, warranty support) through the application.

In yet other embodiments, components of the fleet connectivity system 300 (e.g., the user device 308 and/or the application, etc.) are also configured to support additional commerce functions, as discussed above. For example, one or more applications (e.g., on the connectivity module 320 with the integrated indicator 326, the user device 308, etc.) may be configured to receive, store, process, and/or provide third party advertising, point of sale, etc. data and/or indications. In an exemplary embodiment, the connectivity module 320 (and/or the indicator 326) is configured to provide an indication relating to a number of users present at a work site, a time of day, a purchase incentive from a vendor, user preferences, etc. Further, the connectivity module 320 (and/or the indicator 326) may be configured to provide indications that capture a record of sales conversions in response to electronic messaging as a basis for revenue calculation for a sales channel.

As discussed above, in some embodiments the connectivity module 320 and/or the indicator 326 are configured to receive pressure data relating to one or more components of the work machine 324. In an exemplary embodiment, the connectivity module 320 and/or the indicator 326 is configured to receive pressure data from the control system 322, determine various statuses, parameters, characteristics, etc. relating to the work machine 324, and/or provide an indication relating to the determined statuses or characteristics of the work machine 324 or components thereof. For example, the connectivity module 320 may receive pressure data relating to the chassis, platform, forks, a load, etc. of the work machine 324. Based on the data, the connectivity module 320 (and/or the control system 322) may determine a relative pressure difference between components of the work machine 324, a relative position and/or orientation of the components (e.g., height, elevation, etc.), a the position of the work machine 324 with respect to a floorplan of a work site, a network (e.g. a mesh network), the user device 308, and/or another machine 304, etc. In some embodiments, the connectivity module 320 (and/or the control system 322) is configured to determine an operational height of the work machine 324 or components thereof, a current state (e.g., height elevation, etc.) of components of the work machine 324, for example a platform. The connectivity module 320 (and/or the indicator 326) may also provide an indication relating to the determined position and/or orientation of the work machine 324 and/or components thereof. For example, the connectivity module 320 may provide an elevation indication, a component height warning, a verified height calculation, a safety check status, a height safety indication, etc. As shown in FIG. 3, in some embodiments the connectivity module 320 and/or the indicator 326 are configured to receive sensor data from onboard sensors (e.g., on the work machine 324) and/or off board sensors (e.g., sensors not located on the work machine, the auxiliary sensors 302, on the user device 308, a work site hub device, etc.).

As will be discussed in greater detail below, the connectivity module 320 (e.g., with the integrated indicator 326) may incorporate various components that allow the integrated connectivity module 320 and/or indicator 326 to perform various functions required by the fleet connectivity system 300 (e.g. GPS sensor, GPS antenna, Bluetooth transmitter, Bluetooth antenna, WiFi module, WiFi antenna, cellular data transmitter, cellular data antenna, pressure transducer, light sensor, accelerometer/inertial measurement unit, memory storage, processor, multiple colored LEDs, etc.). For example, the connectivity module 320 and/or indicator 326 may include components configured to determine and provide an indication of a status of a machine, analyze and provide an indication relating to customer and/or commercial services, analyze and provide an indication relating to electronic services, analyze and provide an indication relating to machine configuration and location information, receive and store data and software (e.g., for over-the-air software updates, storing technical and/or service manuals, storing advertising files, etc.), control one or more components of a work machine based on a criteria, etc. While the connectivity module 320 is described herein as performing certain functions, it is understood that the connectivity module 320 may perform different and/or similar functions using additional, fewer, and/or different working components.

Figure 4:
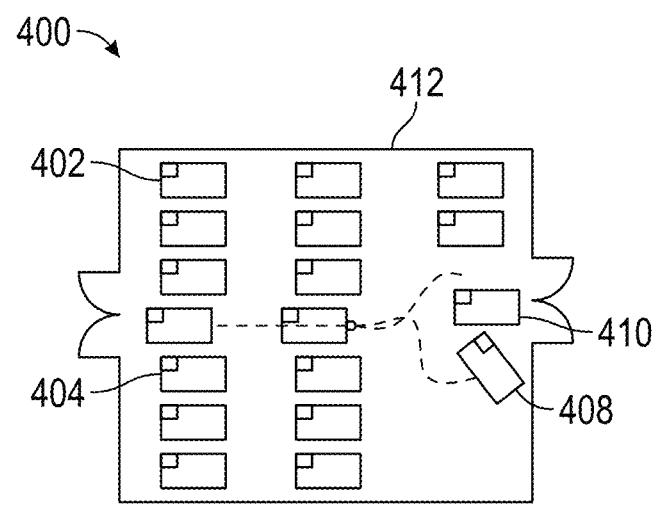
FIG. 4 is a schematic representation of a work site and equipment staging area with a fleet connectivity system deployed, according to some embodiments.

Referring now to FIG. 4, a fleet connectivity system 400 is shown, according to an exemplary embodiment. As discussed above, the fleet connectivity system 400 may be deployed at a work site 412 to control a fleet of work machines 402, 404, 408, 410, so as to collaboratively perform tasks requiring more than one work machine 408, 410. For example, a user may wish to move the work machine 410 from its stored position on the left of the work site 412 out the door on the right of the work site. Components of the fleet connectivity system 400 (e.g., a network access point, a system access point, a connectivity hub, work machines having a connectivity module, etc.) may communicate with both the work machine 408 and the work machine 410, causing the work machine 408 to move out of the way of the work machine 410, so that the work machine 410 can move past the work machine 408 and out the doorway.

Figure 5:
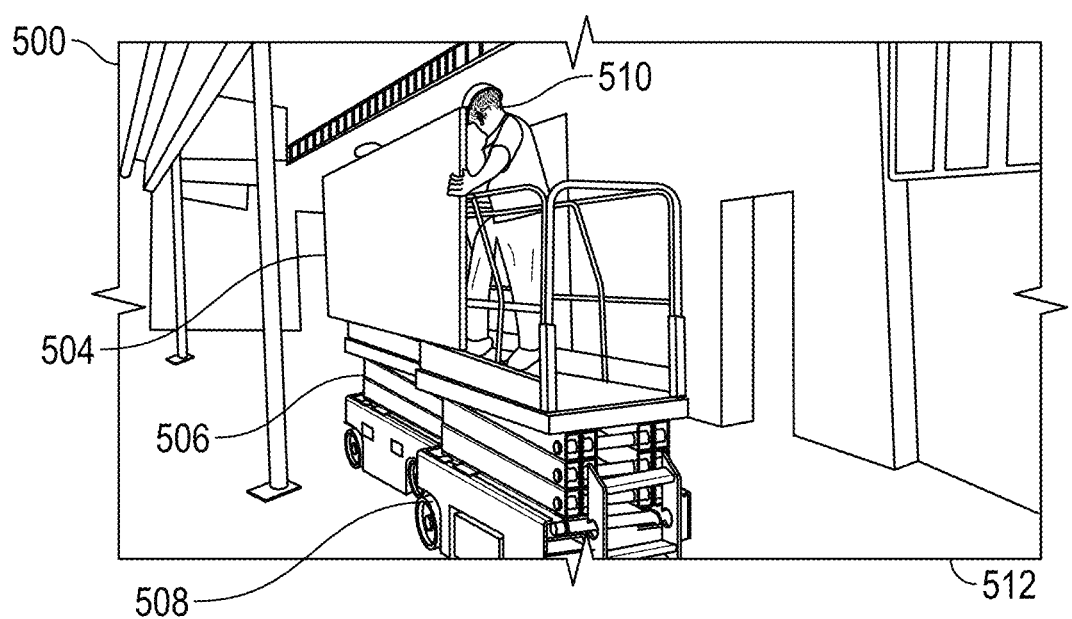
FIG. 5 is an illustrative representation of a work site with a fleet connectivity system connecting two pieces of equipment, according to some embodiments.

Referring now to FIG. 5, a fleet connectivity system 500 is shown, according to an exemplary embodiment. As discussed above, the fleet connectivity system 500 may be communicably coupled to a plurality of work machines 506, 508 (e.g., via a plurality of connectivity modules), such that the work machines 506, 508 may collaboratively perform tasks on a jobsite 512. For example, as shown in FIG. 5 the fleet connectivity system 500 may be used to replace a section of drywall 504 that is too large to be handled by a single work machine 508. Components of the fleet connectivity system 500 (e.g., a network access point, a system access point, a connectivity hub, etc.) may communicate with both the work machine 506 and the work machine 508 and cause them to move at the same speed and in the same direction so that a user 510 on each work machine 506, 508 may hold the drywall 504 while the work machines 506, 508 are moving. In this regard, communication between components of the fleet connectivity system and the work machines 506, 508 may prevent the work machines 506, 508 from being separated so that the users 510 do not drop the drywall 504.

Figure 6:
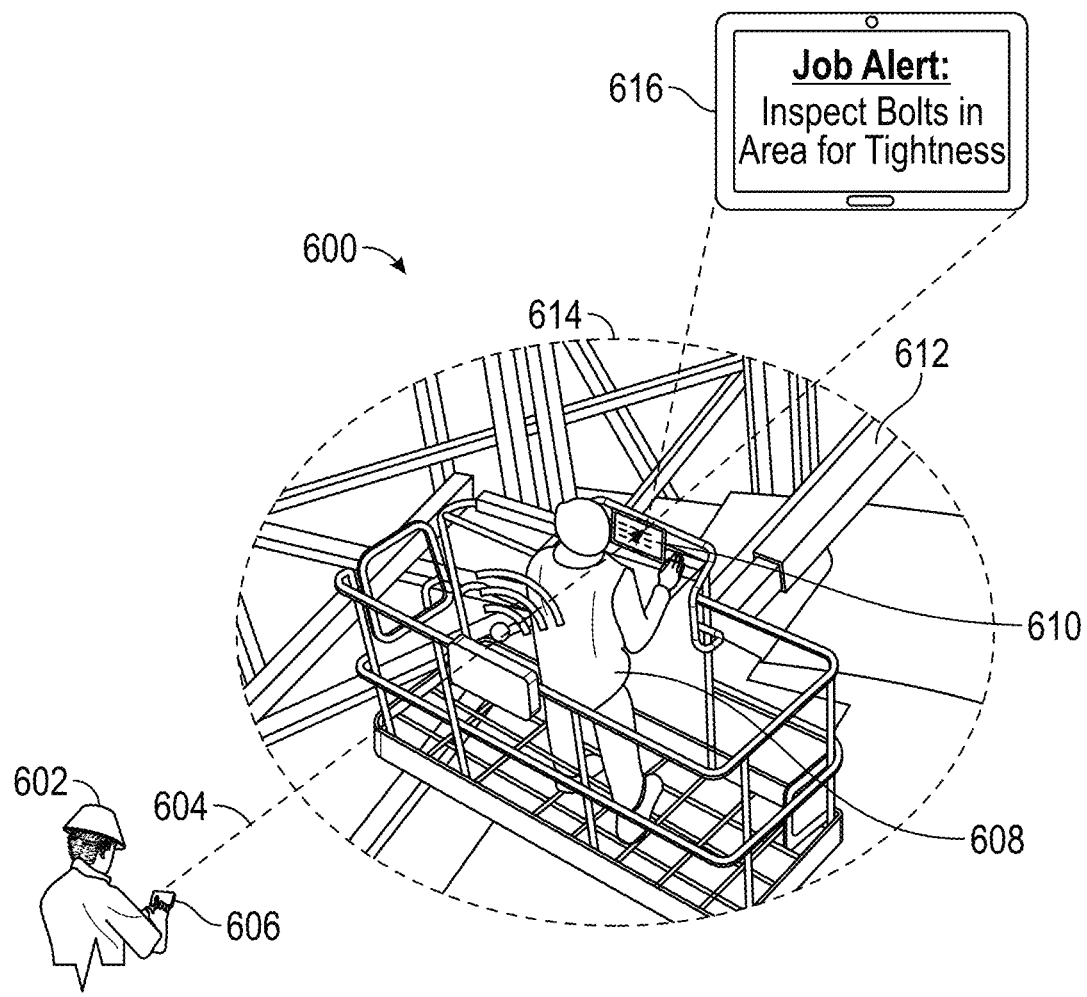
FIG. 6 is an illustrative representation of a piece of equipment with a fleet connectivity system providing connectivity to a remote user, according to some embodiments.

Referring now to FIG. 6, a remote user 602 of a fleet connectivity system 600 can send messages and data 604 from a remote device 606 to an onsite user 608 on a jobsite 614. The messages and data 604 may be received by the control system 610 of a work machine 612 and displayed via a user interface on an onboard display 616. The remote device 606 may send work instructions to the onsite user 608, informing the onsite user 608 of talks to be performed using the work machine 612. For example, as shown in FIG. 6, the remote user 602 may send instructions to the onsite user 608 to use the work machine 612 to inspect bolt tightness in the area. The instructions may be displayed for the onsite user 608 on the onboard display 616. This allows the onsite user 608 to receive and view the instructions without the need to call the remote user 602 or write the instructions down. Because the work machine 612 is connected to the remote device 606 (e.g., via a connectivity module 218) the remote user 602 may receive the location of the work machine 612, as well as other work machines on the jobsite 614, and may use the location information to determine the instructions to send.

Figure 7:
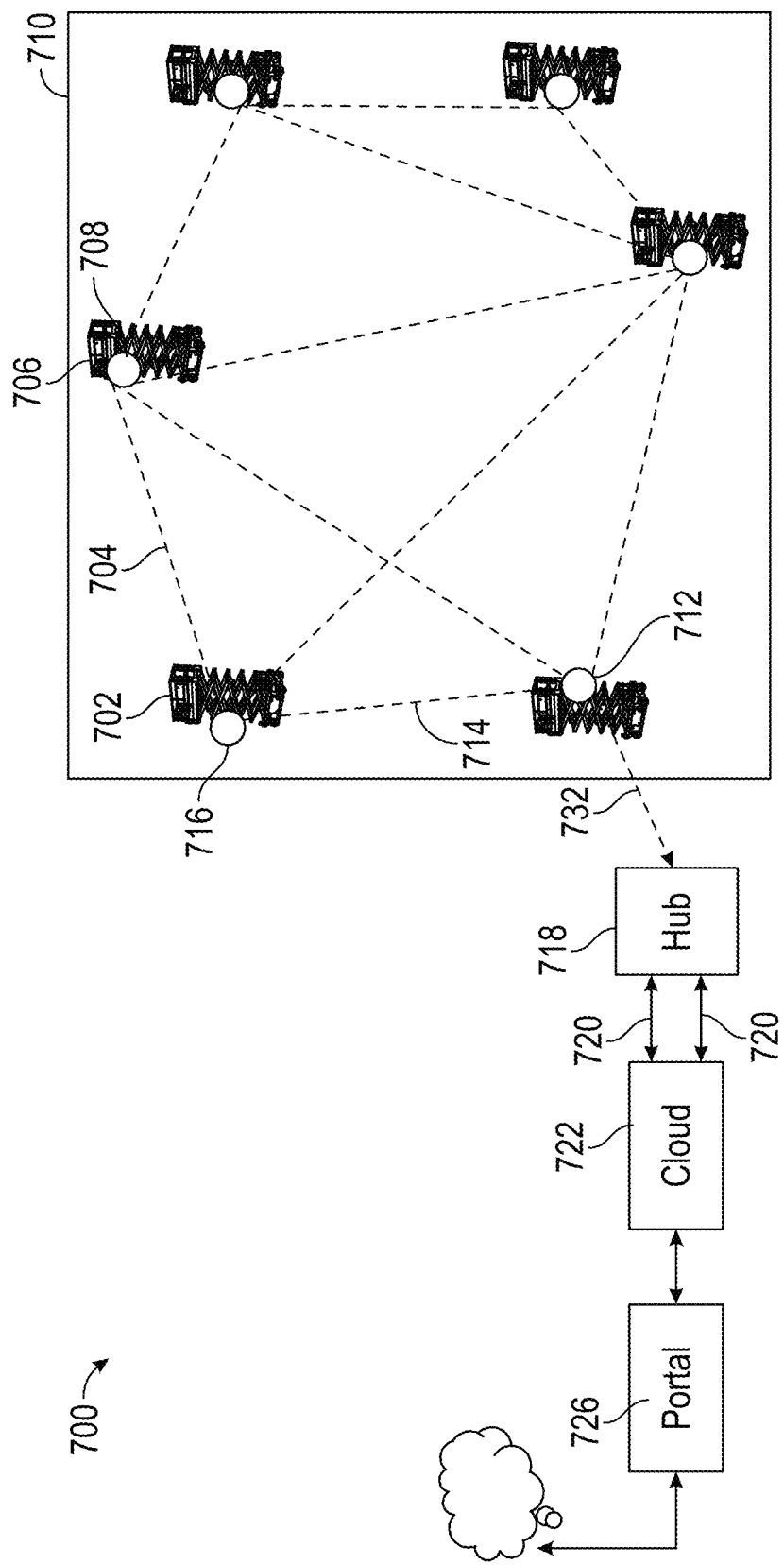
FIG. 7 is a schematic representation of a work site with a fleet connectivity system deployed with connectivity to off-site systems, according to some embodiments.

Referring to FIG. 7, a fleet connectivity network system 700 includes a connectivity hub 718. In some embodiments, the connectivity hub 718 includes and/or communications with a connectivity module. In some embodiments, the connectivity hub is configured to communicatively connect with one or more connectivity module equipped machines (e.g., work machines 702, 706) in proximity to the connectivity hub 718. In some embodiments, the connectivity hub is configured to broadcast a work site identification signal. In some embodiments, the connectivity hub is configured to connect work machines 702, 706 connected to the local fleet network to an external internet feed. In some configurations, the connectivity hub 718 is configured as a gateway to one or more communications systems or network systems to enable exchanges of data 720, 722 between nodes 708, 712, 716 on the work site 710 local fleet connectivity mesh network 704, 714, 732 and nodes 726 external to the work site. In some embodiments, connectivity hub has a connectively module that (a) provides the functionalities described here in place of or in addition to a machine that has a connectivity module, (b) broadcasts a site identifier, and/or (c) connects to an external internet to flow through data to and from the jobsite that is provided across the mesh.

Figure 8:
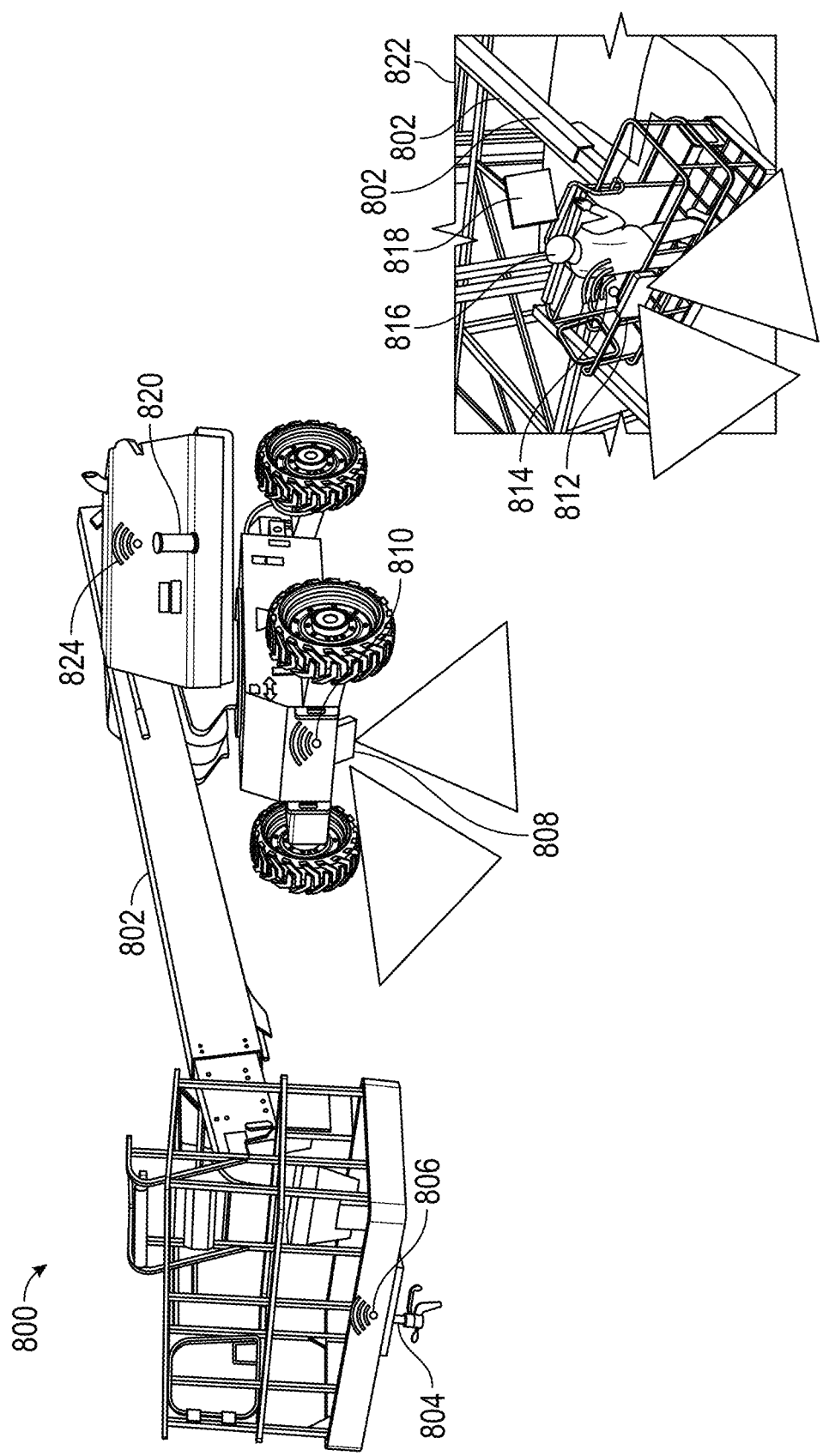
FIG. 8 is an illustrative representation of an apparatus configured with a fleet connectivity system, according to some embodiments.

Referring to FIG. 8, a sensor network system 800 is shown. Sensors 804, 808, 812, 820 may be coupled to a work machine 802 on a jobsite 822. The sensors may be, for example, object detection sensors 808 812, environmental sensors 804 (e.g., wind speed, temperature sensors), and tagged consumable sensors 820. The sensors 804, 808, 812, 820 may be connected to and may send data to a fleet connectivity system via wireless connections 806, 810, 814, 824. The sensor data may be displayed or may be used to generate messages for display on an onboard display 818 for a user 816 of the work machine 802. The onboard display 818 may receive the sensor data via a direct wired or wireless connection to the sensors. Alternatively, the sensors may communicate with the onboard display through the fleet connectivity system (e.g., via a connectivity module 218). Sensor data from various work machines may be combined to map the jobsite 822, and to determine if environmental conditions are safe for using the work machines. Sensor data from the tagged consumable sensors 820 may be used to determine, for example, when tagged consumables must be replaced.

Figure 9:
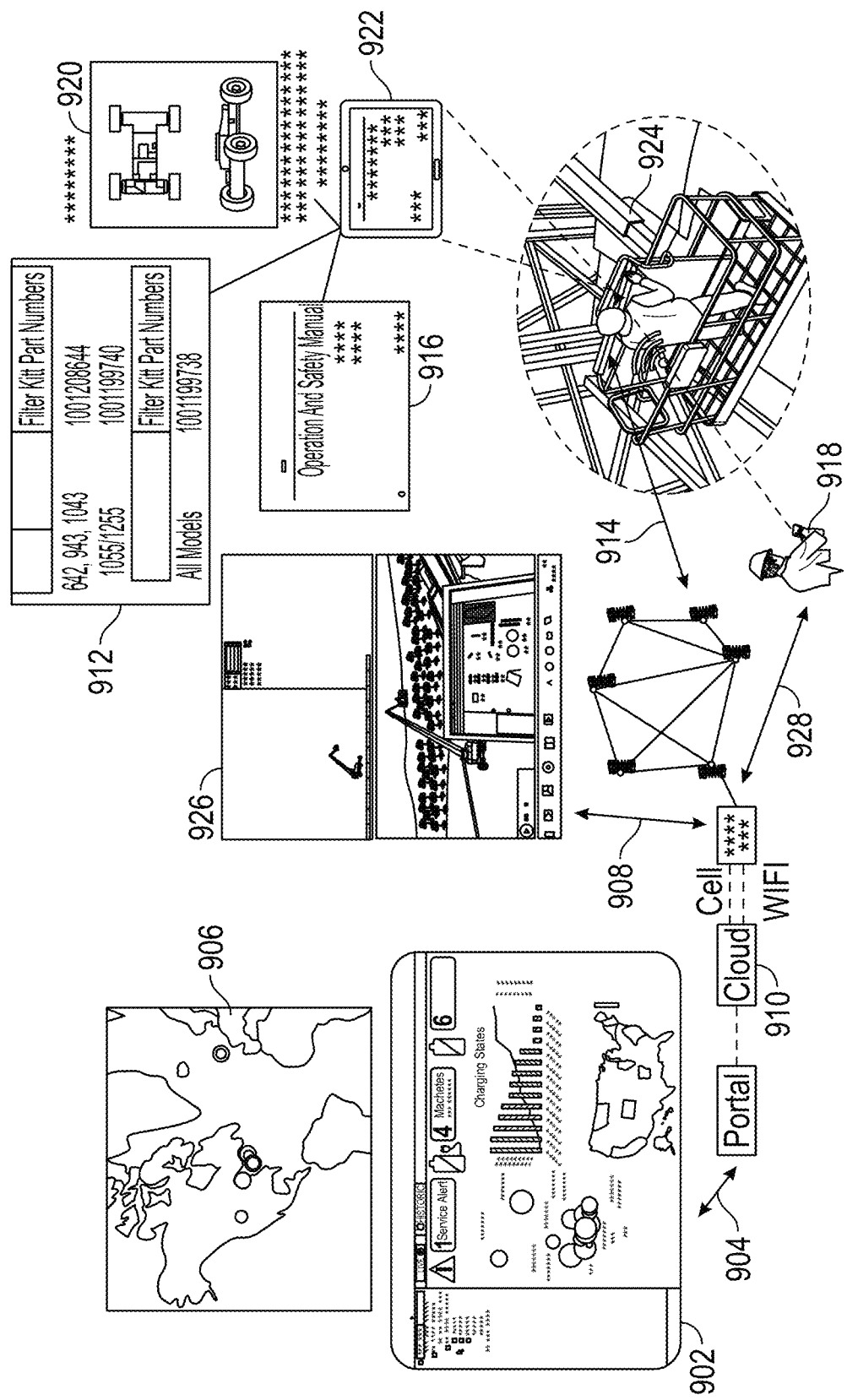
FIG. 9 is an illustrative example of a graphical user interface of a fleet connectivity system, according to some embodiments.

As shown in FIG. 9, various user interfaces are available to be displayed on a remote user device 918 and an onboard display 922 of a work machine 924. A connectivity hub 910 may send and receive data 928, 908, 904 914 including the user interfaces 902, 906, 912, 916, 926, 920. The user interface 906 is a heatmap of locations of a plurality of work machines. The user interface 902 is a machine status display that shows the battery level, location, and alerts relating to a plurality of work machines. User interface 926 shows a digital twin of a work machine that updates based on sensor data of an associated work machine. User interface 912 is a list of part numbers for the work machine 924. User interface 916 is an operation and safety manual for the work machine 924. User interface 920 is a detailed schematic of the work machine 924.

Figure 10:
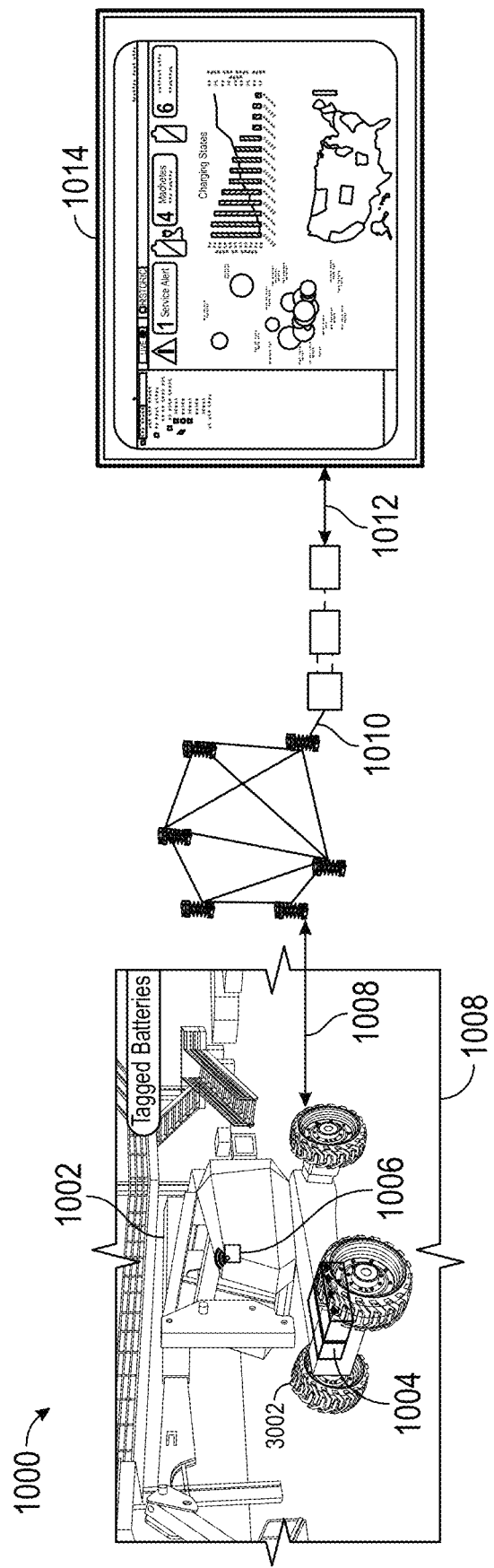
FIG. 10 is an illustrative representation of a work machine with machine specific output data connected to a fleet connectivity system, according to some embodiments.

As shown in FIG. 10, a tagged consumable tracking system 1000 is shown. A work machine 1002 on a jobsite 1008 includes tagged consumables 1004 (e.g., batteries connected to battery charger 1006). The work machine 1002 sends and receives data 1012 to and from a connectivity hub 1010. The connectivity hub 1010 sends and receives data 1012 to and from a user interface 1014. Data regarding the tagged consumables 1004 may be communicated to the user interface 1014 via the connectivity hub 1010. For example, battery charge state and battery health may be sent to the user interface 1014. When the battery health falls below a predetermined state, for example, when the battery is only able to hold half of its original charge, the connectivity hub 1010 may send an alert to the user interface 1014 indicating that the battery should be replaced.

Figure 11:
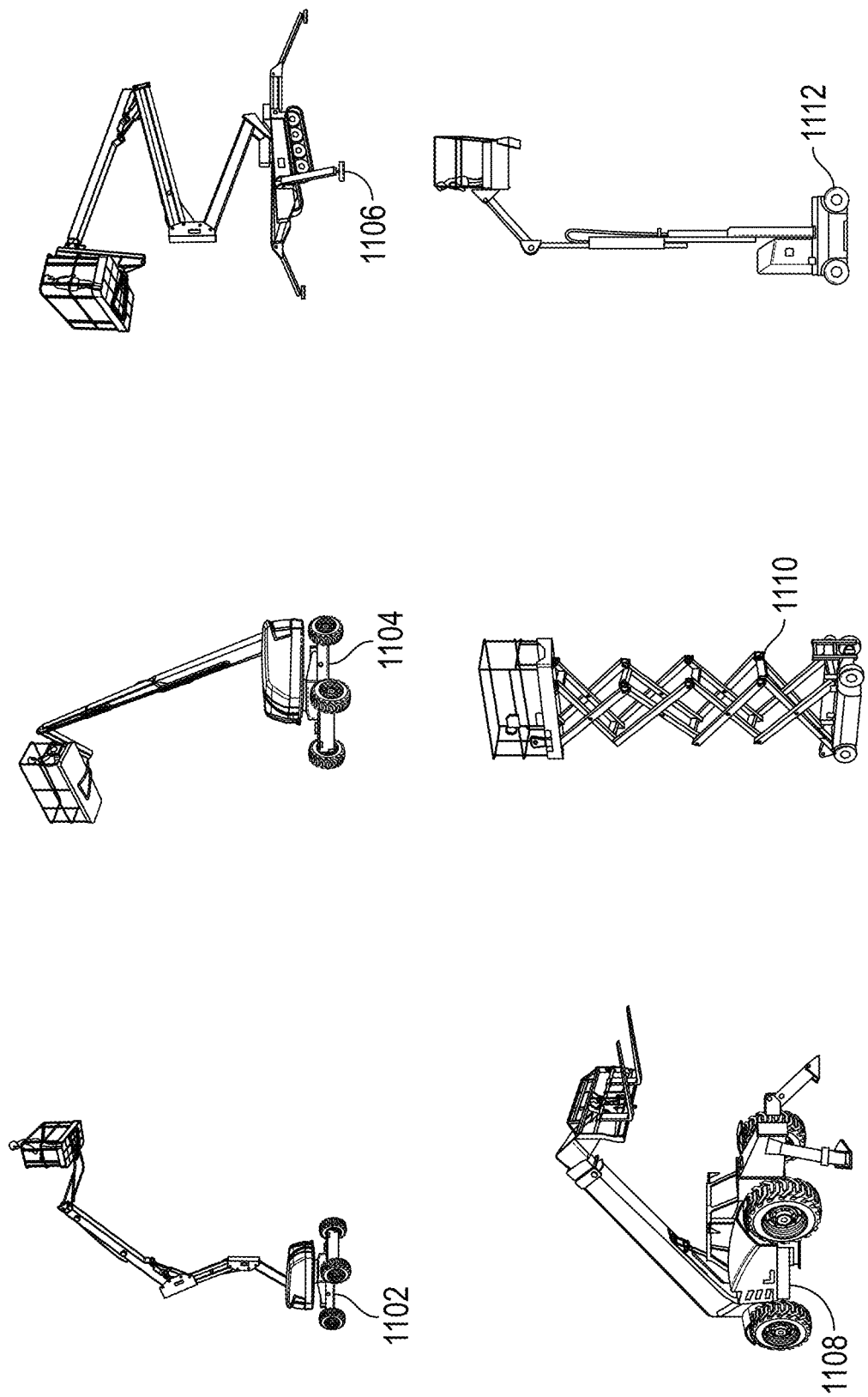
FIG. 11 is an illustrative representation of work machines configured for use in a fleet connectivity system, according to some embodiments.

Referring now to in FIG. 11, the fleet connectivity network systems described above may be implemented using various work machines 20 (e.g., lift devices, etc.). For example, and as shown in FIG. 11, the fleet connectivity systems may be implemented as an articulating boom lift 1102, a telescoping boom lift 1104, a compact crawler boom lift 1106, a telehandler 1108, a scissor lift 1110 (and/or 506, 508 as shown in FIG. 5), and/or a toucan mast boom lift 1112.

According to the exemplary embodiment shown in FIG. 11, the work machines 20 (e.g., a lift device, articulating boom lift 1102, telescoping boom lift 1104, compact crawler boom lift 1106, telehandler 1108, scissor lift 1110, toucan mast boom lift 1112) include various working components. As an illustrative example, the articulating boom lift 1102 may include a chassis (e.g., a lift base), which supports a rotatable structure (e.g., a turntable, etc.) and a boom assembly (e.g., boom). According to an exemplary embodiment, the turntable is rotatable relative to the lift base. According to an exemplary embodiment, the turntable includes a counterweight positioned at a rear of the turntable. In other embodiments, the counterweight is otherwise positioned and/or at least a portion of the weight thereof is otherwise distributed throughout the work machines 20 (e.g., on the lift base, on a portion of the boom, etc.). As shown in FIG. 11, a first end (e.g., front end) of the lift base is supported by a first plurality of tractive elements (e.g., wheels, etc.), and an opposing second end (e.g., rear end) of the lift base is supported by a second plurality of tractive elements (e.g., wheels). According to the exemplary embodiment, the front tractive elements and the rear tractive elements include wheels; however, in other embodiments the tractive elements include a track element.

In an exemplary embodiment, the boom includes a first boom section (e.g., lower boom, etc.) and a second boom section (e.g., upper boom, etc.). In other embodiments, the boom includes a different number and/or arrangement of boom sections (e.g., one, three, etc.). According to an exemplary embodiment, the boom is an articulating boom assembly. In one embodiment, the upper boom is shorter in length than lower boom. In other embodiments, the upper boom is longer in length than the lower boom. According to another exemplary embodiment, the boom is a telescopic, articulating boom assembly. By way of example, the upper boom and/or the lower boom may include a plurality of telescoping boom sections that are configured to extend and retract along a longitudinal centerline thereof to selectively increase and decrease a length of the boom.

In an exemplary embodiment, the lower boom has a first end (e.g., base end, etc.) and an opposing second end (e.g., intermediate end). According to an exemplary embodiment, the base end of the lower boom is pivotally coupled (e.g., pinned, etc.) to the turntable at a joint (e.g., lower boom pivot, etc.). In some embodiments, the boom includes a first actuator (e.g., pneumatic cylinder, electric actuator, hydraulic cylinder, etc.), which has a first end coupled to the turntable and an opposing second end coupled to the lower boom. According to an exemplary embodiment, the first actuator is positioned to raise and lower the lower boom relative to the turntable about the lower boom pivot.

In an exemplary embodiment, the upper boom has a first end (e.g., intermediate end, etc.), and an opposing second end (e.g., implement end, etc.). According to an exemplary embodiment, the intermediate end of the upper boom is pivotally coupled (e.g., pinned, etc.) to the intermediate end of the lower boom at a joint (e.g., upper boom pivot, etc.). As shown in FIG. 11, the boom includes an implement (e.g., platform assembly) coupled to the implement end of the upper boom with an extension arm (e.g., jib arm, etc.). In some embodiments, the jib arm is configured to facilitate pivoting the platform assembly about a lateral axis (e.g., pivot the platform assembly up and down, etc.). In some embodiments, the jib arm is configured to facilitate pivoting the platform assembly about a vertical axis (e.g., pivot the platform assembly left and right, etc.). In some embodiments, the jib arm is configured to facilitate extending and retracting the platform assembly relative to the implement end of the upper boom. As shown in FIG. 11, the boom includes a second actuator (e.g., pneumatic cylinder, electric actuator, hydraulic cylinder, etc.). According to an exemplary embodiment, the second actuator is positioned to actuate (e.g., lift, rotate, elevate, etc.) the upper boom and the platform assembly relative to the lower boom about the upper boom pivot.

According to an exemplary embodiment, the platform assembly is a structure that is particularly configured to support one or more workers. In some embodiments, the platform assembly includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly includes a control panel to control operation of the work machines 20 (e.g., the turntable, the boom, etc.) from the platform assembly. In other embodiments, the platform assembly includes or is replaced with an accessory and/or tool (e.g., forklift forks, etc.).

Figure 12:
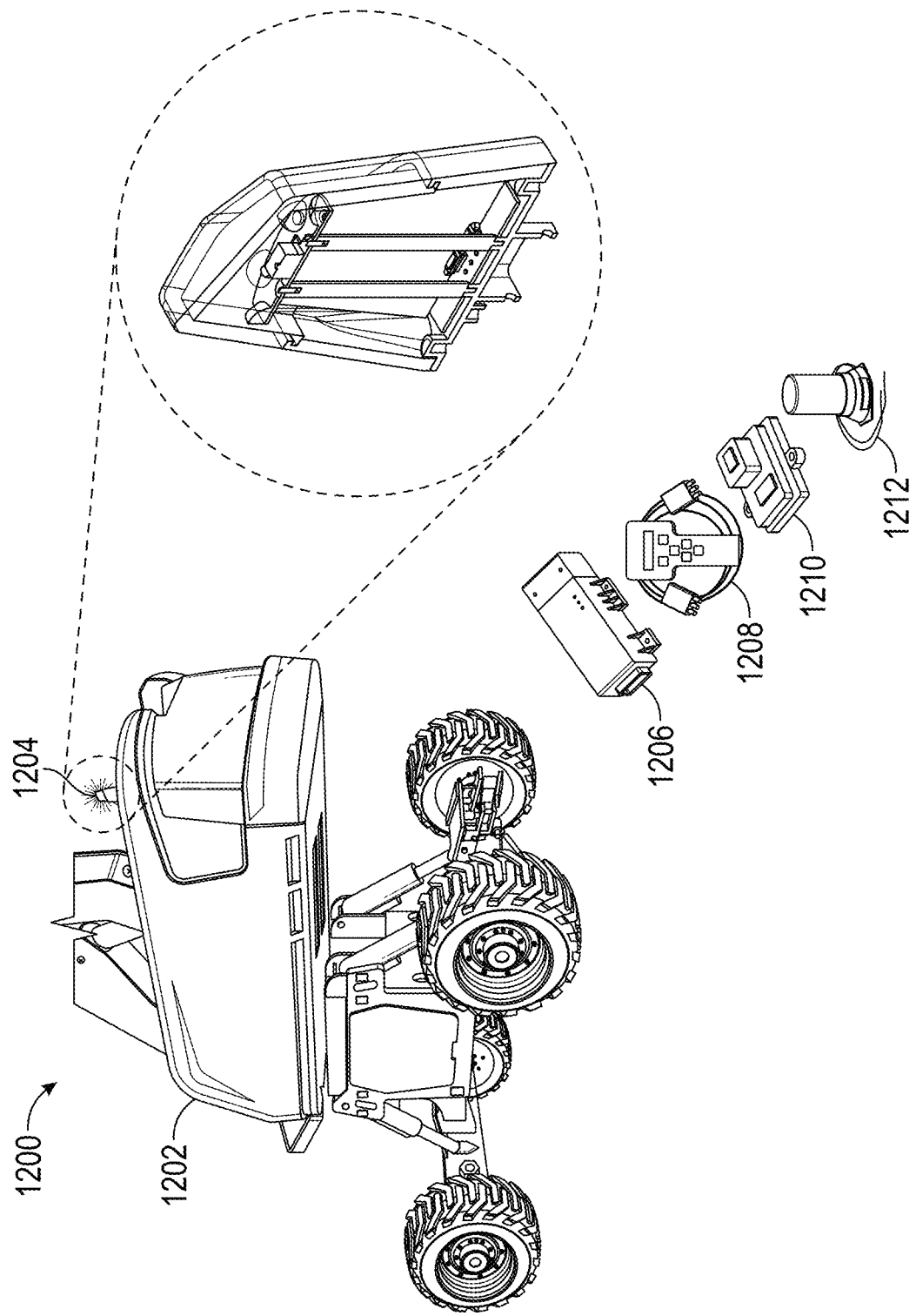
FIG. 12 is an illustrative representation of a work machine provisioned with an integrated connectivity module and beacon, according to some embodiments.

Referring to FIG. 12, a work machine with a connectivity module with an integrated beacon is shown, according to an exemplary embodiment. According to an exemplary embodiment, the work machine 1202 is configured to be integrated with, and communicate with components of, a fleet connectivity system (e.g., the fleet connectivity system 200, the fleet connectivity system 300, the fleet connectivity system 400, the fleet connectivity system 500, the fleet connectivity network system 700, and/or any combination thereof, etc.). In some embodiments, the connectivity module is the connectivity module 218 of FIG. 2, the connectivity module 320 of FIG. 3, and/or any other suitable connectivity module. The beacon may be the indicator 326 of FIG. 3, and/or another suitable indication system or device configured to provide an indication to a user and/or observer, as discussed above.

As shown in FIG. 12, the work machine 1202 is provisioned with a connectivity module 1204 and is communicably coupled to components of a fleet connectivity system (e.g., the fleet connectivity system 200 of FIG. 2, the fleet connectivity system 300 of FIG. 3, etc.). The connectivity module 1204 is shown to include a telematics control unit 1206, one or more analytics devices (i.e., shown as analyzer 1208), one or more multi-channel communication modems (i.e., shown as communication modem 1210), and a multi-function beacon (i.e., shown as beacon 1212). According to an exemplary embodiment, the telematics control unit 1206 is configured to receive and/or communicate data relating to conditions, states, statuses, etc. of the work machine 1202 (e.g., via sensors, processors, etc.). For example, the telematics control unit 1206 may receive data relating to a fuel level, the status of a component of the work machine 1202 (e.g., retracted, extended, open, closed, etc.), whether the work machine 1202 is on or off, whether the work machine 1202 is in operation or moving, a charge level of the work machine 1202, whether the work machine 1202 is charging and/or charged, whether the work machine 1202 requires a diagnostic check, a trouble shooting check, maintenance, DTC, characteristics of the work machine 1202 (e.g., machine type, model, work site tag, etc.), etc. In some embodiments, the telematics control unit 1206 is configured to receive and/or communicate data relating to customer and/or commercial services, provisioning and/or updating the work machine 1202, pressures and/or positioning of one or more components of the work machine 1202, electronic commerce services, etc., as discussed above. In other embodiments, the telematics control unit 1206 is configured to control one or more components of the work machine 1202, for example based on one or more criteria relating to the work machine 1202 (e.g., a status, customer and/or commercial services, updates, pressure and/or positioning data, etc.). Further, the analyzer 1208 may be configured to receive (e.g., via the telematics control unit 1206) and/or analyze data relating to conditions, states, statuses, etc. of the work machine 1202. For example, the analyzer 1208 may be configured to receive data relating to and/or determine a fuel level of a machine, a status of a component of a machine, a charge level of a machine, whether a machine is on or off, whether a machine is moving, whether a machine needs a diagnostic check, maintenance, etc.

According to an exemplary embodiment, the communication modem 1210 is configured to receive and/or communicate data relating to conditions, states, statuses, etc. of the work machine 1202 (e.g., to components of the fleet connectivity system 200 of FIG. 2). For example, the communication modem 1210 may communicate a fuel level of the work machine 1202 to an application (e.g., on the user device 272), communicate information relating to customer and/or commercial services to an application (e.g., on the user device 272) or a hub (e.g., the customer subscription management 248 hub), communicate information relating to provisioning and/or updating the work machine 1202 to an application or a hub (e.g., the device provisioning 250 hub). Further, the communication modem 1210 may communicate information relating to pressures and/or positioning of one or more components of the work machine 1202 to an application (e.g., on the user device 272), communicate information relating to electronic commerce services to an application (e.g., on the user device 272) or a hub (e.g., the asset allocation 258 hub), and/or communicate any other suitable information relating to a condition, state, status, etc. of the work machine 1202. The beacon 1212 may be configured to receive and/or provide an indication (e.g., a visual indication, audio indication, tactile indication, a message, etc.) relating to a condition, state, status, etc. of the work machine 1202 to a user and/or observer. For example, the beacon 1212 may be configured to provide an indication relating to a battery charge level of the work machine 1202 (e.g., a green light indicating sufficient charge, a yellow light indicating a mid-level charge, a red light indicating the machine needs to be charged, etc.) in response to a request from a user (e.g., via an application on the user device 272). In some embodiments, the connectivity module 1204 includes additional and/or different working components, for example one or more antennas, one or more power sources, one or more positioning systems (e.g., global positioning services devices, etc.), one or more local fleet connectivity processors, and one or more interface blocks, one or more machine connectivity provisions, and one or more memory devices (e.g., databases, etc.), etc.

In some embodiments, components of the connectivity module 1204 (e.g., the telematics control unit 1206) are also configured to control components of the work machine 1202. For example, the connectivity module 1204 may be configured to selectively enable, activate, disable, and deactivate components of the work machine 1202 (e.g., headlights, a horn, a light, the beacon 1212, the chassis, a control system, a wheel, etc.) in response to a request or command from a user (e.g., via an application on the user device 272). In other embodiments, components of the connectivity module 1204 (e.g., the telematics control unit 1206) are configured to control components of the work machine 1202 in accordance with instructions provided from a user (e.g., via an application on the user device 272). For example, the connectivity module 1204 may provide an indication via the beacon 1212 relating to a status of the work machine 1202 (e.g., a charge status, a fuel level, etc.) in order for a user or observer to more efficiently complete a work flow.

Figure 13:
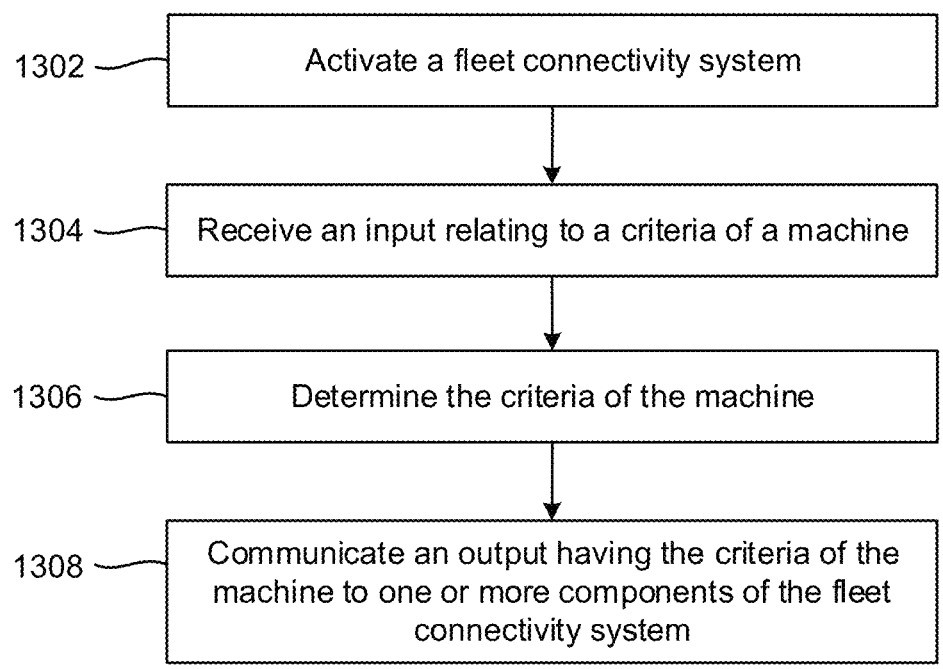
FIG. 13 is a flow diagram of a process for implementing components of a fleet connectivity system interoperable with a process for conditional data reporting, according to some embodiments.

Referring to FIG. 13, a process for implementing components of a fleet connectivity system interoperating with a system for device association and provisioning is shown, according to an exemplary embodiment. The process 1300 may utilize any combination of components described herein (e.g., the fleet connectivity system 200 of FIG. 2, the fleet connectivity system 300 of FIG. 3, the connectivity module 1204 of FIG. 12, etc.). According to an exemplary embodiment, the process 1300 configured to provide an output to one or more components of a work machine in accordance with one or more criteria of the work machine. In some embodiments, the process 1300 is also configured to control one or more components of a work machine or work machines (e.g., via a connectivity module, a beacon, etc.).

At step 1302, a fleet connectivity system is activated, according to an exemplary embodiment. The fleet connectivity system may be the local fleet connectivity system 200 of FIG. 2, the fleet connectivity system 300 of FIG. 3, the fleet connectivity system 400 of FIG. 4, the fleet connectivity system 600 of FIG. 6, and/or any combination of components thereof. As discussed above, the fleet connectivity system may include one or more work machines, which may include a connectivity module (e.g., the connectivity module 218 of FIG. 2, the connectivity module 320 of FIG. 3, the connectivity module 1204 of FIG. 12, etc.). In an exemplary embodiment, at step 1302 the work machines, devices, equipment systems, etc. of the connectivity system may be deployed to a work site via communications between components of the connectivity system.

At step 1304, an input relating to one or more work machine criteria is received, according to an exemplary embodiment. In an exemplary embodiment, the input is received from an application on a user device (e.g., the user device 272), for example the input is received at the connectivity module 1204 and/or components of the connectivity module 1204 (e.g., via a network). The input may include a condition, state, and/or status of the machine desired by a user (e.g., fuel level, battery charge level, operational status of a machine, whether a machine needs a diagnostic check, trouble shooting, etc., as discussed above). In other embodiments, the input includes customer and/or commercial services relating to a work machine, provisioning and/or updates to a work machine, pressures and/or positioning of one or more components of the work machine, electronic commerce services, and/or any other suitable information relating to a work machine desired by a user. In some embodiments, the input is received from another suitable system or device, for example a controller of a work machine (e.g., the controller 206, etc.), a sensor of a work machine, a product development hub (e.g., customer subscription management 248 hub, the device provisioning 250 hub, asset allocation 258 hub, etc.), and/or another suitable source. According to an exemplary embodiment, the connectivity module 1204 may further communicate the input to other components of the work machine and/or the connectivity module 1204 (e.g., the analyzer 1208, etc.) in order to determine one or more criteria of the work machine, as discussed in 1306.

At step 1306, one or more criteria of the work machine is determined, according to an exemplary embodiment. In an exemplary embodiment, components of the connectivity module 1204 receive the input relating to the criteria of the work machine, and automatically determine the criteria of the work machine. For example, the connectivity module 1204 (e.g., the analyzer 1208, etc.) may determine a status of the work machine (e.g., fuel level, battery charge level, operational status of a machine, whether a machine needs a diagnostic check, trouble shooting, etc.), customer and/or commercial services relating to the work machine, provisioning and/or updates available to the work machine, pressures and/or positioning of one or more components of the work machine (e.g., chassis, platform, boom, lift, etc.), electronic commerce services relating to the work machine, and/or any other suitable information relating to a work machine based on the input.

At step 1308, an output having the criteria of the work machine is communicated to one or more components of the fleet connectivity system, according to an exemplary embodiment. In an exemplary embodiment, the connectivity module 1204 is configured to communicate the output to a component of the work machine (e.g., the beacon 1212, a sensor, an interface, etc.), a user device (e.g., the user device 308), an application, another work machine (e.g., the other work machine 304, etc.), and/or any other suitable component of a fleet connectivity system. For example, the connectivity module 1204 may communicate an output to an indication device (e.g., the beacon 1212, another beacon, a component of the work machine, etc.) in order to provide an indication (e.g., visual, audio, tactile, a message, etc.) relating to the status of the work machine (e.g., a green light indicating sufficient charge, a yellow light indicating a mid-level charge, a red light indicating the machine needs to be charged, etc.). In some embodiments, the connectivity module 1204 is configured to communicate the output (e.g., via the communication modem 1210) to an interface of the work machine in order to provide a message (e.g., via the interface) relating to customer and/or commercial services, electronic commerce services, and/or other services. In other embodiments, the connectivity module 1204 is configured to communicate the output (e.g., via the communication modem 1210) to a control system (e.g., a controller, processor, etc.) of the work machine in order to provide provisioning and/or updates to the systems of the work machine. In yet other embodiments, the connectivity module 1204 (e.g., via the communication modem 1210) is configured to provide the output to components of the work machine (e.g., chassis, platform, boom, a wheel, etc.) in order to provide positioning and/or orientation information relating to the component and/or the work machine. In some embodiments, the connectivity module 1204 is configured to provide the output to another work machine and/or a fleet connectivity hub, in order to provide information relating to one or more work machines in a fleet.

In other embodiments, the connectivity module 1204 (e.g., the telematics control unit 1206) is configured to communicate an output that controls one or more components of the work machine in accordance with the criteria of the work machine. For example, the connectivity module 1204 may communicate an output that controls an indicator device (e.g., the beacon 1212) in order to provide an indication (e.g., visual, audio, tactile, a message, etc.) relating to the status of the work machine (e.g., a green light indicating sufficient charge, a yellow light indicating a mid-level charge, a red light indicating the machine needs to be charged, etc.). In some embodiments, the connectivity module 1204 is configured to provide an output to control an interface of the work machine to provide a message (e.g., via the interface) relating to customer and/or commercial services, electronic commerce services, etc. In other embodiments, the connectivity module 1204 is configured to provide an output to control a control system (e.g., a controller, processor, etc.) of the work machine in order to provide provisioning and/or updates to the systems of the work machine. In yet other embodiments, the connectivity module 1204 is configured to provide an output to control the chassis, platform, boom, a wheel, and/or another component of the work machine in order to reposition and/or reconfigure the work machine. In this regard, in response to a work machine receiving an input relating to one or more criteria of the work machine (and determining the criteria of the work machine), the connectivity module may provide an output to one or more components of the fleet connectivity system (and/or control the work machine) in order to more efficiently and effectively complete a task. It should be understood that while certain criteria of the work machine are described herein (e.g., status of the work machine, customer and/or commercial services, etc.), any other suitable criteria relating to a work machine are contemplated.

Figure 14:
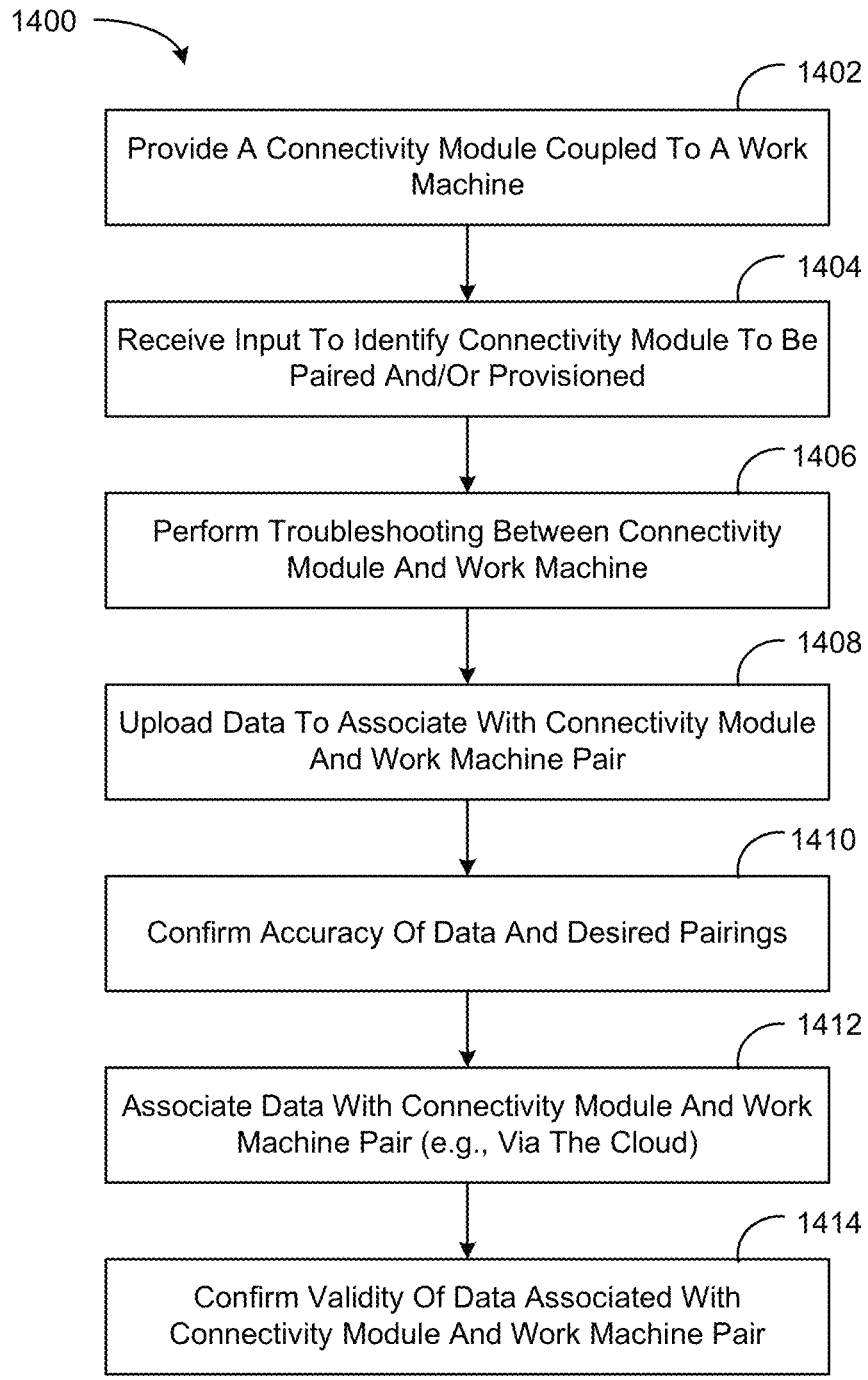
FIG. 14 is a flow diagram of a process for device association and provisioning interoperable with a system for conditional data reporting, according to some embodiments.

Referring to FIG. 14, a process for device association and provisioning interoperable with conditional data reporting is shown, according to an exemplary embodiment. The process 1400 may be run on a remote computer system, a remote device, a user device (e.g., a phone, laptop, tablet, etc.), or hosted on an application on a user device. The process 1400 may be interoperable and improve any combination of components described herein (e.g., the fleet connectivity system 200 of FIG. 2, the fleet connectivity system 300 of FIG. 3, the connectivity module 1204 of FIG. 12, etc.). According to an exemplary embodiment, the process 1400 is configured to associate a connectivity module (a new connectivity module, untrusted/unused connectivity module, previously paired connectivity module, etc.) with a work machine. In some embodiments, the process 1400 is also configured to pair one or more components of a work machine or work machines (e.g., via a connectivity module)

to a profile tied to the connectivity module and work machine pair (e.g., storage in the cloud, file on a remote computing system, etc.). In other embodiments, the process 1400 is configured to confirm the legitimacy of the connectivity modules, work machine parts, and work machines associated via the process.

At step 1402, according to an exemplary embodiment, one or more connectivity modules and one or more work machines are provided, each connectivity module may be physically coupled to a respective one of the work machines (e.g., a connectivity module is already installed on a work machine). For example, each work machine may be coupled to a connectivity module (e.g., the connectivity module 218 of FIG. 2, the connectivity module 320 of FIG. 3, the connectivity module 1204 of FIG. 12, etc.). Because each connectivity module is coupled to a work machine, the serial number (or identification number, serial plate, etc.) of the connectivity module may be obscured.

At step 1404, an input relating to a connectivity module identity is received, according to an exemplary embodiment. In an exemplary embodiment, the input is received from an application on a user device (e.g., the user device 272), for example, the input is received at the connectivity module 1204 and/or components of the connectivity module 1204 (e.g., via a network). The input may include an instruction to flash a light on the indicator of the connectivity module so that the user may know which connectivity module/work machine combination is being paired/associated/provisioned. By flashing the light of the desired connectivity module, the connectivity module can be differentiated from a group of similar connectivity modules and work machines. For example, the connectivity module 218 (e.g., indicator 326, beacon 1212, etc.) may provide a visual indication (e.g. colored lights, for example white, red, blue, green, orange, etc.; patterned lights, for example solid, flashing, strobed, etc.; a light having varied optical characteristics, for example wavelength, intensity, pulse duration, direction, etc.; and/or any other suitable visual indication system or device), an audible indication (e.g., a noise, alarm, warning, message, etc.), a tactile signal (e.g., vibration, etc.), and/or any other suitable indication or signal (e.g., a message to the user device 272, an icon on an application, a message to the internal visualizations 246, etc.). While multiple machine/connectivity module groups are present in the same area, the audio or visual indication for each one may be different and allow the user to identify the specific grouping to be paired/associated/provisioned. The connectivity modules may communicate with one another (e.g., form a mesh network, a local network, etc.) to allow the user device to communicate with one or more of the connectivity modules. The user device may select a specific connectivity module to edit/pair/provision which may prevent or lock out other user devices from attempting to edit/pair/provision the selected connectivity module while the process is in progress (e.g., once an application on a user device selects a connectivity module to pair, no other application/user device can attempt to pair the connectivity module until the process is ended/completed/cancelled/etc.).

At step 1406, troubleshooting between the connectivity module and work machine (e.g., the desired connectivity module and desired work machine to be paired) is performed. Troubleshooting may be initiated via a mobile application on a user device that sends inputs and receives outputs from the connectivity module, work machine, and/or components thereof. For example, troubleshooting may determine whether various communications channels, statuses, connections, systems, and components of the connectivity module and work machine are interoperating/coupled/compatible/etc. In some embodiments, troubleshooting determines whether the connectivity module is receiving enough power, whether the connectivity module and/or work machine can communicate (e.g., CAN, cellular, WiFi, BLE, GPS), whether the connectivity module is registering certain functionalities of the work machine, whether all components of the connectivity module are functional, etc. Further troubleshooting may be run between the connectivity module and certain components of the work machine (e.g., determining whether the connectivity module registers/communicates with BLE tags corresponding to work machine sub-systems, etc.). Certain failures in troubleshooting may be overridden (e.g., via the mobile application, via the user device), while others may result in the process for device association and provisioning to terminate, restart, fail, etc. An error or notification indicating the results of the troubleshooting may be displayed (e.g., on a GUI of a user interface of the user device, via the mobile application, via the connectivity module, via the display of the work machine, etc.).

At operation 1408, data associated with the connectivity module and work machine pair is collected, gathered, and stored. For example, the connectivity module and work machine pair may be used to generate a profile unique to the connectivity module work and machine pair that lists/identifies/facilitates communication between the connectivity module, work machine, cloud, and other components of the local fleet connectivity system. In other words, the pairing alerts the connectivity module to the type of data that will be received and communicated to/from the work machine, via the connectivity module, and to other components in the network. In some embodiments, a user device (via an application, user interface, etc.) may capture images of serial numbers associated with machine components, parts, systems, sensors, etc. (e.g., the serial plate of an axle assembly, the serial number of a specific wheel, the serial number or identification code associated with a sensor, etc.). The application may provide various overlays, prompts, camera cues depending on the type of part/component/sensor/serial plate that is selected or visible to the camera/user device. For example, for a serial plate associated with an axle assembly, the application may display an overlay on the user interface of the user device indicating where the user should focus the camera. Optical character recognition (OCR) may be used to capture the serial numbers/identification codes desired to be associated with the connectivity module and machine pair.

In step 1410, confirmation may be received that the serial number, component, system, sensor desired to be paired (e.g., via OCR) is correct. For example, upon registering a serial number, the application may prompt the user to confirm that an identified axel assembly is intended to be associated with the connectivity module and machine pair. If the user actually captured the serial number of a wheel, sensor, etc., the user may reject the pairing and retry the process of collecting data to pair the component with the connectivity module and machine pair. In other embodiments, the process may prompt the user to visually confirm the serial number or select the type of component seeking to be paired which may then be checked against the results of the OCR.

In step 1412, the serial numbers associated with the connectivity module, work machine, machine components, subsystems, sensors, etc. are uploaded to the cloud. In this way, the serial numbers, components, connectivity module, work machine may be authenticated and grouped as one unit. Further, and as explained related to the system for conditional data reporting, the serial numbers may be utilized to generate a customized profile from a uniform or base starting profile to facilitate specific communications and data collection from a particular work machine, pair, etc. At operation 1414, the data and serial numbers for each component may be confirmed against a database of expected serial numbers, customer numbers, part numbers, etc. to confirm that the parts being paired or associated with the work machine and connectivity module are legitimate. The confirmation step may also include that the part, work machine, connectivity module being paired is being associated with an expected customer number, is not already associated with another connectivity module and work machine pair, is sourced from a designated supplier, etc. If the system detects that the components are already associated with another connectivity module or work machine, the user may be prompted to update the associations on the respective machines, or the process may automatically update the profiles/databases with respect to those machines, parts, and/or connectivity modules. For example, the confirmation process may confirm that the part numbers are not associated with components from untrusted suppliers, are not third-party systems that may skim data, etc.

Specifically, the database may store data therein comprising one or more of expected serial numbers, customer numbers, model numbers, software numbers, or identifiers of specific equipment, parts, sensors, or software packages available for association with a work-machine-connectivity-module pair. For example, the database may include a registry of purchased parts, a list of equipment associated with a company or client, a designation of an approved client account or client number, or the like. The system may compare the data indicative of one or more functionalities of the work machine with the data stored in the database. In one embodiment, the database may include a part number of a purchased part (e.g., Axel No. 11223344). The axle may then be installed on a work machine. The system may associate the axel with the work machine by building a data-entry in a profile corresponding to the work machine and having the machine-specific state. The profile may include the part number (Axel No. 11223344). Further, based on the comparison, the system may confirm that the data indicative of the one or more functionalities of the work-machine-connectivity-module pair is legitimate and may modify at least one machine-specific profile to associate or disassociate the data stored in the database with at least one work-machine-connectivity-module pair. For example, the system may verify the legitimacy of the axel by looking up and/or confirming that that Axel No. 11223344 is included in the database, listed as approved/valid in the database, or the like. Further, if the database or another profile indicates that Axel No. 11223344 is associated with a second work machine, the system may automatically update the database, the association, and/or the profile(s) of the work machine and/or the second work machine to indicate that Axel No. 11223344 is now equipped to the work machine and not the second work machine.

Figure 15:
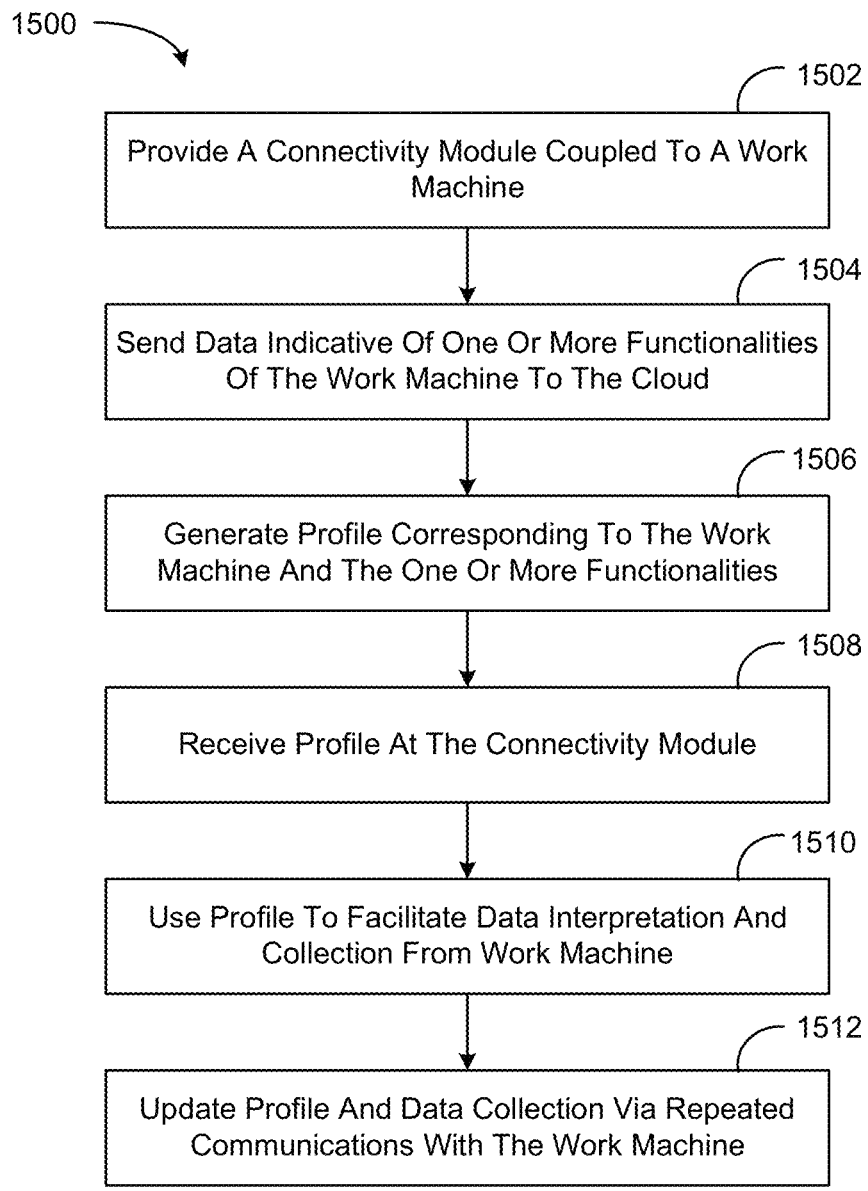
FIG. 15 is a flow diagram of a process for conditional data reporting, according to some embodiments.

Referring to FIG. 15, a process for conditional data reporting is shown, according to an exemplary embodiment. The process 1500 may be run on the cloud/a remote device(s) or by a controller, a remote computer system, a user device (e.g., a phone, laptop, tablet, etc.), or hosted on an application on a user device, etc.

At step 1502, according to an exemplary embodiment, one or more connectivity modules and one or more work machines are provided, each connectivity module may be physically and communicatively coupled to a respective one of the work machines (e.g., a connectivity module is already installed on a work machine and configured to send and receive signals from the work machine to a local fleet connectivity system, the cloud, etc.). For example, each work machine may be coupled to a connectivity module (e.g., the connectivity module 218 of FIG. 2, the connectivity module 320 of FIG. 3, the connectivity module 1204 of FIG. 12, etc.). The connectivity module may be initially configured to send a limited set of data to and from the work machine. Accordingly, the system for conditional data reporting may be utilized to generate a profile that expands the data/communications or otherwise facilitate communication via the connectivity module.

At step 1504, data indicative of one or more functionalities of the work machine is sent to the cloud. For example, the work machine may send, via the connectivity module, serial numbers, model numbers, software numbers, etc. to the cloud, a remote device, a remote computer system, etc. for processing by the system for conditional data reporting. In other embodiments, a user device with a user interface and application hosted on the user device may scan (e.g., via OCR) or input serial numbers, model numbers, software numbers, etc. and report the same to the system for conditional data reporting. In this way, the system for conditional data reporting is informed of specific equipment, sensors, software packages, etc. to associate with the work machine and to use to generate and populate a profile associated with the work machine, work machine/connectivity module pair, etc.

At step 1506, a profile is generated and may be populated with entries to facilitate the interpretation of data, signals, inputs, etc. by the systems of the work machine and connectivity module. For example, the system may begin with a base profile that includes only a base state that is agnostic to machine type, make, model, sensor package, communication mode, etc. The base state may include a limited set of information. For example, the base state may include one or more empty lists or data sections, one or more prompts to add a work machine component, a date of creation of the profile, a profile name, a profile identification number, a serial number/identification number associated with the work machine and connectivity module pair associated with the profile, or the like. The system may then modify or build upon the generic profile based on data received from the work machine, data received from the connectivity module, and/or according to the data indicative of one or more functionalities. For example, the system may receive a serial number XX-XXX-XXX. The system may associate that serial number with a specific sensor (e.g., a pressure sensor with specific channels, setup, file paths, etc.). The system may then modify the base profile from the base state to a machine-specific state such that it includes entries associated with the particular code, files, data/communication channels necessary to interoperate with and collect data from the specific sensor, work machine, etc. In other embodiments, the system may receive a software version and populate the profile with data to ensure that all components of the fleet connectivity system are interoperable with the software version. For each component, system, sub-system, the profile is generated and customized based on the particular data received. Thus, rather than locally storing large data files associated with all possible combinations of work machines, sensors, software packages, etc., each profile may be generated in the cloud specific to the work machine based on data communicated from or related to that work machine (e.g., the base profile is modified upon the system recognizing that a serial number received corresponds to a boom lift, that is equipped with pressure sensors of a certain make, tires of a certain size/model, etc.). In this way, small chunks of data associated with known parts are used to generate a larger, customized profile associated with a work machine and specific parts coupled to or used in conjunction with that work machine.

At step 1508, the profile generated by the system is received by one or more connectivity modules. The profile may be stored on the connectivity module, on the local memory of the work machine, etc. At step 1510, the profile instructs the connectivity modules (e.g., the connectivity module coupled to the work machine associated with the serial numbers used to populate the profile) on how to interact, communicate, and interoperate with the work machine. For example, the profile and the machine-specific state thereof may inform the connectivity module on what type of sensor data to expect from the work machine, what distance will be covered per rotation of the work machine's tires (e.g., data indicating a quality of a specific component equipped to the work machine), what communication modes to use to interact with the work machine, etc.

At step 1512, the system updates the profile associated with the work machine. For example, the system may receive additional communications from a user device indicating that a new serial number, part number, software version, etc. has been added or installed on the work machine. The system may then modify, edit, or add on to the profile or files associated with the work machine such that the connectivity module and related components are instructed on how to interoperate and collect/transmit data related to the new part, sensor, software package, etc. In other embodiments, the connectivity module may communicate the installation of additional equipment and the system populates the profile with channels, data, communications protocols to further instruct the connectivity module on how to integrate or function with the equipment. Specifically, updating the profile may occur in response to receiving additional communications indicative of one or more additional and/or removed functionalities associated with the work machine. In this way, if a new sensor is installed, if a sensor is removed, if a software package is updated/revised, or the like—the system may add, remove, and/or revise data associated with the profile and/or the machine the machine-specific thereof. For example, the system may add, remove, and/or revise an entry from the list of components equipped to the work machine, data indicating the quality of the specific component equipped to the work machine, the expected data format associated with the one or more functionalities of the work machine, the communication protocol corresponding to the one or more functionalities of the work machine, the sensor type equipped to the work machine, the specific part number of the part of the work machine, or the software version associated with the work machine, etc.

Although the systems and methods are described herein with reference to a lift device, a lift assembly, or a work machine, the systems and methods may additionally or alternatively be applied to any other type of vehicle or machine. By way of example, these systems and methods may apply to any type of lift device (e.g., boom lifts, scissor lifts, vertical lifts, manual lifts, aerial work platforms, telehandlers, etc.). By way of another example, these systems and methods may apply to vocational vehicles, such as fire fighting vehicles, fire trucks, concrete mixers, delivery vehicles, military vehicles, refuse vehicles, etc.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-3, it should be understood that the controller 44 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the control system 60 may be implemented in machine-readable medium for execution by various types of processors, such as the processor 52 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the load map interface systems and methods as shown in the various exemplary embodiments is illustrative only. Additionally, any element disclosed in one embodiment may be incorporated or utilized with any other embodiment disclosed herein. For example, the warning zones of the exemplary embodiment may be eliminated or additional zones may be added. Although only one example of an element from one embodiment that can be incorporated or utilized in another embodiment has been described above, it should be appreciated that other elements of the various embodiments may be incorporated or utilized with any of the other embodiments disclosed herein.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A system for conditional data reporting, the system comprising:
 a connectivity module, the connectivity module communicatively and physically coupled to a work machine; and
 one or more processing circuits configured to generate a profile corresponding to the connectivity module and the work machine, the one or more processing circuits comprising one or more memory devices coupled to one or more processors, the one or more memory devices configured to store instructions thereon that, when executed by the one or more processors, cause the one or more processors to:
  generate the profile corresponding to the work machine and the connectivity module, the profile initially comprising a base state including at least one empty communication data entry configured to receive communication information associated with communicating with a component associated with the work machine;
receive data indicative of the component;
obtain the communication information associated with communicating with the component based on the data indicative of the component;
populate, after receiving the data indicative of the component, the at least one empty communication data entry with the communication information to create a machine-specific state of the profile that facilitates data interpretation and collection related to the component associated with the work machine by the connectivity module;
send the profile comprising the machine-specific state to the connectivity module; and
update the profile in response to receiving one or more additional communications indicative of one or more additional and/or removed components associated with the work machine, wherein updating the profile comprises revising the machine-specific state to add, remove, and/or revise one or more of:
an entry from a list of components equipped to the work machine,
data indicating a quality of a specific component equipped to the work machine,
an expected data format associated with the component,
a communication protocol corresponding to the component,
a sensor type equipped to the work machine,
a specific part number of a part of the work machine, or
a software version associated with the work machine.

2. The system of claim 1, wherein:
the base state of the profile is agnostic to at least one of a work machine type, one or more work machine components, or a work machine communication mode; and
the base state comprises one or more of a profile name, a profile identification number, or a serial number associated with at least one of the work machine or the connectivity module.

3. The system of claim 1, further comprising at least one of a user device, a remote device, a computer system, or a controller configured to send a message including the data indicative of the component to the one or more processing circuits.

4. The system of claim 3, wherein:
the at least one user device, remote device, computer system, or controller includes at least one of a cellular device, a tablet, a laptop, or a scanner configured to capture an image or receive an OCR input; and
the data indicative of the component comprises at least one of an identification of the component associated with the work machine, an image of the component associated with the work machine, a serial number, a part number, or a software identifier.

5. The system of claim 1, wherein the connectivity module is configured to:
collect and interpret data received from the work machine via the profile comprising the machine-specific state; and
communicate the data received from the work machine to a fleet connectivity system via the profile comprising the machine-specific state.

6. A system for conditional data reporting, the system comprising:
one or more processing circuits comprising one or more memory devices coupled to one or more processors, the one or more memory devices configured to store instructions thereon that, when executed by the one or more processors, cause the one or more processors to:
communicate across a network by sending messages to a connectivity module, a work machine, and a remote device each communicatively connected to the network;
generate a profile corresponding to the work machine and the connectivity module, the profile comprising a base state including at least one empty communication data entry configured to receive communication information associated with communicating with a component associated with the work machine;
receive, from the remote device via the network, a message including data indicative of a component associated with the work machine;
obtain communication information associated with communicating with the component based on the data indicative of the component;
modify the profile and the base state using the communication information to populate the at least one empty communication data entry to create a machine-specific state of the profile that facilitates data interpretation and collection related to the component associated with the work machine by the connectivity module;
send the profile comprising the machine-specific state to the connectivity module; and
update the profile in response to receiving one or more additional communications indicative of one or more additional and/or removed components associated with the work machine, wherein updating the profile comprises revising the machine-specific state to add, remove, and/or revise one or more of:
an entry from a list of components equipped to the work machine,
data indicating a quality of a specific component equipped to the work machine,
an expected data format associated with the component,
a communication protocol corresponding to the component,
a sensor type equipped to the work machine,
a specific part number of a part of the work machine, or
a software version associated with the work machine.

7. The system of claim 6, wherein:
the base state of the profile is agnostic to at least one of a work machine type, one or more work machine components, or a work machine communication mode; and
the base state comprises one or more of a profile name, a profile identification number, or an identifier associated with at least one of the work machine or the connectivity module.

8. The system of claim 6, wherein the data indicative of the component comprises at least one of:
a serial number, a customer number, a model number, a software number, or an identifier of specific equipment, parts, sensors, or software packages associated with the work machine.

9. The system of claim 6, further comprising:
a database storing data therein comprising one or more of an expected serial number, an expected customer number, an expected model number, an expected software number, or an expected identifier of specific equipment, parts, sensors, or software packages available for association with at least one work-machine-connectivity-module pair; wherein:
the work machine and the connectivity module form a work-machine-connectivity-module pair; and
the one or more memory devices are configured to store instructions thereon that, when executed by the one or more processors, further cause the one or more processors to:
compare the data indicative of the component with the data stored in the database;
confirm, based on the comparison, that the data indicative of the component is legitimate; and
modify at least one machine-specific profile to associate or disassociate the data stored in the database with the at least one work-machine-connectivity-module pair.

10. The system of claim 6, wherein the connectivity module is configured to:
collect and interpret data received from the work machine via the profile comprising the machine-specific state; and
send the data received from the work machine to a fleet connectivity system via the profile comprising the machine-specific state.

11. A method for conditional data reporting, the method comprising:
providing a work machine and a connectivity module;
generating, by one or more processing circuits, a profile corresponding to the work machine and the connectivity module, the profile comprising a base state including at least one empty communication data entry configured to receive communication information associated with communicating with a component associated with the work machine;
receiving, by the one or more processing circuits, data indicative of the component;
obtaining, by the one or more processing circuits, the communication information associated with communicating with the component based on the data indicative of the component;
after receiving the data indicative of the component, modifying, by the one or more processing circuits, the at least one empty communication data entry with the communication information to create a machine-specific state of the profile that facilitates data interpretation and collection related to the component associated with the work machine by the connectivity module;
sending the profile comprising the machine-specific state to the connectivity module; and
updating the profile in response to receiving one or more additional communications indicative of one or more additional and/or removed components associated with the work machine, wherein updating the profile comprises revising the machine-specific state to add, remove, and/or revise one or more of:
an entry from a list of components equipped to the work machine,
data indicating a quality of a specific component equipped to the work machine,
an expected data format associated with the component,
a communication protocol corresponding to the component,
a sensor type equipped to the work machine,
a specific part number of a part of the work machine, or
a software version associated with the work machine.

12. The method of claim 11, further comprising:
collecting and interpreting, by the one or more processing circuits and via the profile comprising the machine-specific state, data acquired by the work machine.

13. The method of claim 11, further comprising:
comparing, by the one or more processing circuits, the data indicative of the component with data stored in a database;
confirming, by the one or more processing circuits and based on the comparison, that the data indicative of the component is legitimate;
modifying at least one machine-specific profile to associate or disassociate the data stored in the database with at least one work machine and at least one connectivity module; and wherein:
the data stored in the database comprises one or more of an expected serial number, an expected customer number, an expected model number, an expected software number, or an expected identifier of specific equipment, parts, sensors, or software packages available for association with at least one work-machine-connectivity-module pair.

14. The method of claim 11, further comprising:
communicating data received from the work machine to a fleet connectivity system via the profile comprising the machine-specific state.

15. The method of claim 11, further comprising:
receiving, by the one or more processing circuits, a message comprising the data indicative of the component; and wherein:
the message comprises at least one of an identification of the component associated with the work machine, an image of the component associated with the work machine, a serial number, a part number, or a software identifier acquired via OCR.

* * * * *